United States Patent
Kawamura et al.

(10) Patent No.: US 10,215,969 B2
(45) Date of Patent: *Feb. 26, 2019

(54) IMAGE FORMING LENS SYSTEM AND IMAGE PICKUP APPARATUS USING THE SAME

(71) Applicant: OLYMPUS CORPORATION, Tokyo (JP)

(72) Inventors: Kazuteru Kawamura, Tokyo (JP); Takashi Fujikura, Tokyo (JP)

(73) Assignee: OLYMPUS CORPORATION, Tokyo (JP)

( * ) Notice: Subject to any disclaimer, the term of this patent is extended or adjusted under 35 U.S.C. 154(b) by 206 days.

This patent is subject to a terminal disclaimer.

(21) Appl. No.: 15/082,320

(22) Filed: Mar. 28, 2016

(65) Prior Publication Data

US 2016/0209630 A1 Jul. 21, 2016

Related U.S. Application Data

(62) Division of application No. 14/537,163, filed on Nov. 10, 2014, now Pat. No. 9,297,984.

(30) Foreign Application Priority Data

Nov. 8, 2013 (JP) .................................. 2013-232088

(51) Int. Cl.
  *G02B 9/62*   (2006.01)
  *G02B 13/02*  (2006.01)
  (Continued)

(52) U.S. Cl.
  CPC ........... *G02B 13/02* (2013.01); *G02B 13/001* (2013.01); *G02B 27/646* (2013.01);
  (Continued)

(58) Field of Classification Search
  CPC .............. G02B 27/646; G02B 13/0045; G02B 27/0025; G02B 7/09; G02B 9/64;
  (Continued)

(56) References Cited

U.S. PATENT DOCUMENTS 6,512,633 B2  1/2003  Konno et al.
8,537,471 B2  9/2013  Uchida et al.
(Continued)

FOREIGN PATENT DOCUMENTS

JP   09-236743   9/1997
JP   11-160617   6/1999
(Continued)

OTHER PUBLICATIONS

Office Action issued in Japanese Patent Application No. 2014-214230, dated Jul. 18, 2018, 11 pages (with English language translation).

(Continued)

*Primary Examiner* — Evelyn A Lester
(74) *Attorney, Agent, or Firm* — Hunton Andrews Kurth LLP

(57) ABSTRACT

An image forming lens system includes an aperture stop, and an image-side lens unit group which is disposed on an image side of the aperture stop. The image-side lens unit group includes a first image-side lens unit having a negative refractive power, a second image-side lens unit having a positive refractive power, and a third image-side lens unit having a negative refractive power. Any one of the first image-side lens unit, the second image side lens unit, and the third image-side lens unit is a focusing lens unit which moves along the optical axis at the time of focusing, and the following conditional expression (1) is satisfied:

$$0.06 < |f_{fc}/f| < 0.4 \qquad (1)$$

where,
f denotes a focal length of the image forming lens system at the time of focusing at an object at infinity, and
$f_{fc}$ denotes a focal length of the focusing lens unit.

30 Claims, 16 Drawing Sheets

(51) Int. Cl.

| | |
|---|---|
| *G02B 27/64* | (2006.01) |
| *H04N 5/232* | (2006.01) |
| *H04N 5/225* | (2006.01) |
| *G02B 9/00* | (2006.01) |
| *G02B 27/00* | (2006.01) |
| *G02B 9/64* | (2006.01) |
| *G02B 7/09* | (2006.01) |
| *G02B 13/00* | (2006.01) |

(52) U.S. Cl.
CPC ....... *H04N 5/2254* (2013.01); *H04N 5/23212* (2013.01); *H04N 5/23287* (2013.01); *G02B 7/09* (2013.01); *G02B 9/00* (2013.01); *G02B 9/62* (2013.01); *G02B 9/64* (2013.01); *G02B 13/0045* (2013.01); *G02B 27/0025* (2013.01)

(58) Field of Classification Search
CPC ........ G02B 13/02; G02B 13/001; G02B 9/00; G02B 9/62; H04N 5/23212
USPC .................. 359/557, 740, 754, 756–760
See application file for complete search history.

(56) References Cited

U.S. PATENT DOCUMENTS

| | | | |
|---|---|---|---|
| 8,654,456 B2 | 2/2014 | Eguchi | |
| 8,693,113 B2 | 4/2014 | Kuzuhara et al. | |
| 8,848,291 B2 | 9/2014 | Adachi et al. | |
| 9,235,036 B2 | 1/2016 | Kato et al. | |
| 9,297,984 B2* | 3/2016 | Kawamura | G02B 27/646 |
| 9,395,520 B2* | 7/2016 | Kawamura | G02B 27/646 |
| 9,519,124 B2* | 12/2016 | Fujikura | G02B 27/646 |
| 2011/0310486 A1 | 12/2011 | Eguchi | |
| 2012/0026602 A1 | 2/2012 | Uchida et al. | |
| 2012/0229900 A1 | 9/2012 | Adachi | |
| 2012/0293877 A1* | 11/2012 | Watanabe | G02B 27/646 |
| | | | 359/715 |
| 2013/0242175 A1 | 9/2013 | Kuzuhara et al. | |
| 2014/0354857 A1 | 12/2014 | Kato et al. | |
| 2015/0109519 A1 | 4/2015 | Fujikura et al. | |
| 2015/0138428 A1 | 5/2015 | Fujikura et al. | |

FOREIGN PATENT DOCUMENTS

| | | |
|---|---|---|
| JP | 2012-002999 A | 1/2012 |
| JP | 2012-053444 A | 3/2012 |
| JP | 2012-189637 A | 10/2012 |
| JP | 2012-242505 A | 12/2012 |
| JP | 2013-218267 A | 10/2013 |
| JP | 2014-089352 A | 5/2014 |
| JP | 2014-235238 A | 12/2014 |

OTHER PUBLICATIONS

Office Action issued in Chinese Patent Application No. 201410575323. 3, dated Jul. 4, 2016, 18 pages (with English-language translation).

* cited by examiner 435.84 — — —
486.13 —·—·—
656.27 - - - - -
587.56 ———

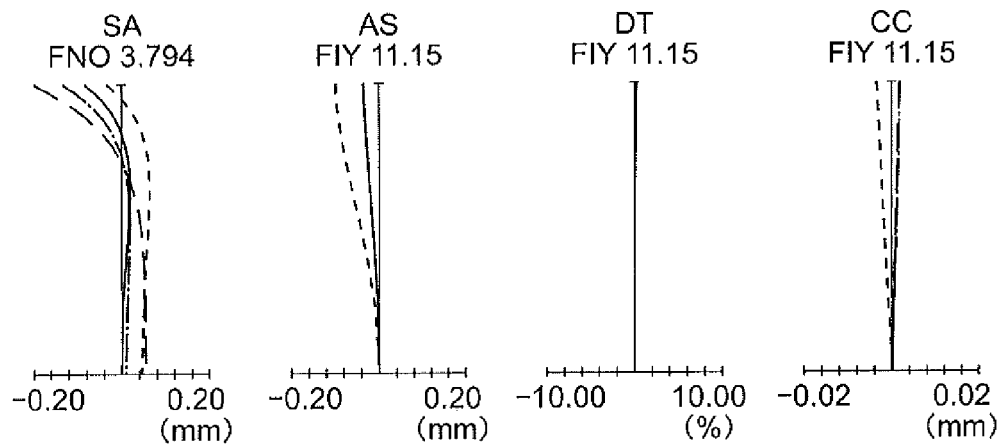
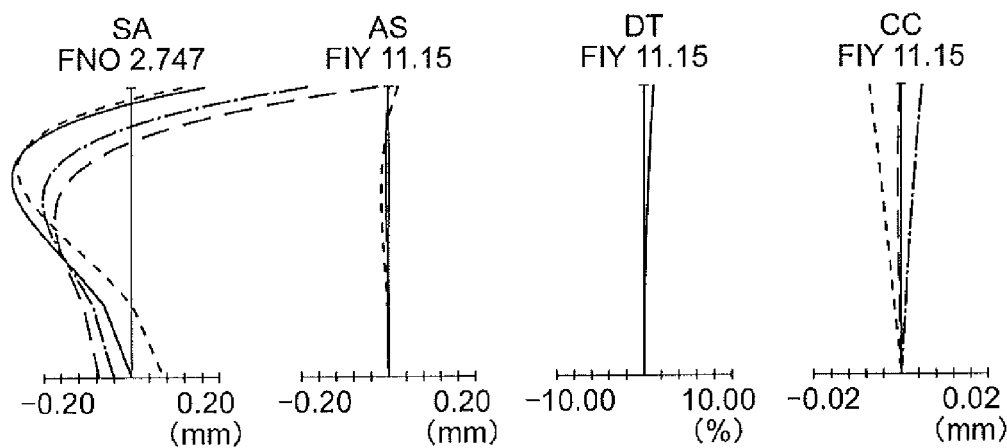

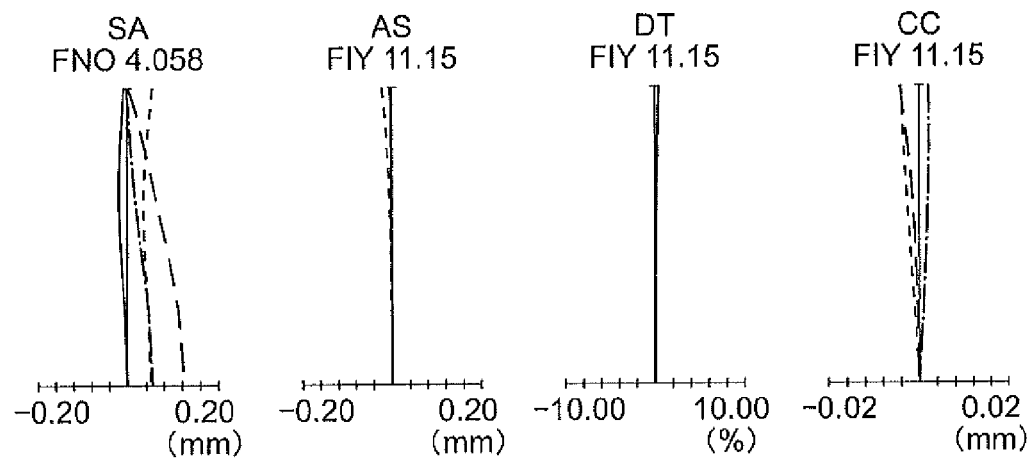
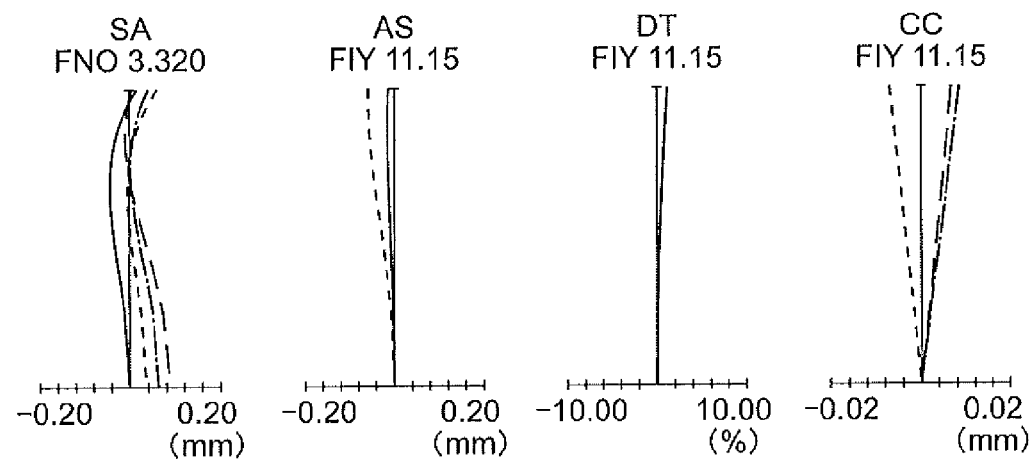

IMAGE FORMING LENS SYSTEM AND IMAGE PICKUP APPARATUS USING THE SAME

CROSS-REFERENCE TO RELATED APPLICATION

The present application is a division of U.S. patent application Ser. No. 14/537,163, now U.S. Pat. No. 9,297,984, filed on Nov. 10, 2014, which is based upon and claims the benefit of priority from the prior Japanese Patent Application No. 2013-232088 filed on Nov. 8, 2013; the entire contents of which are incorporated herein by reference.

BACKGROUND OF THE INVENTION

Field of the Invention

The present invention relates to an image forming lens system and an image pickup apparatus using the same.

Description of the Related Art

In a photography in which, a telephoto lens or an ultra-telephoto lens (hereinafter, appropriately let to be telephoto lens) is used, an effect of drawing a distant object or a small object in front of an eye of a photographer is achieved. Therefore, the telephoto lens has widely been used in photography of various scenes such as photography of sport scenes, photography of wild animals such as wild birds, and photography of astronomical bodies.

As a telephoto lens to be used for photography of such scenes, telephoto lenses disclosed in Japanese Patent Application Laid-open Publication Nos. Hei 9-236743 and Hei 11-160617 are available.

In the photography of abovementioned scenes, relative merits of mobility of an image pickup apparatus become important. Here, the mobility refers to an ease of carrying, a stability at the time of hand-held photography, and a rapidity of focusing speed. For making the mobility of an apparatus superior, an optical system having a small size and light weight is desirable. Moreover, a feature that an optical system is capable of focusing an object rapidly is an important feature that decides the relative merits of mobility.

SUMMARY OF THE INVENTION

An image forming lens system according to the present invention includes,
an aperture stop, and
an image-side lens unit group which is disposed on an image side of the aperture stop, wherein
the image-side lens unit group includes in order from the aperture stop to the image side along an optical axis, a first image-side lens unit having a negative refractive power, a second image-side lens unit having a positive refractive power, and a third image-side lens unit having a negative refractive power, and
any one of the first image-side lens unit, the second image-side lens unit, and the third image-side lens unit is a focusing lens unit which moves along the optical axis at the time of focusing from an object at infinity to an object at a close distance, and
the following conditional expression (1) is satisfied:

$$0.06 < |f_{fo}/f| < 0.4 \qquad (1)$$

where,
f denotes a focal length of the image forming lens system at the time of focusing at an object at infinity, and
$f_{fo}$ denotes a focal length of the focusing lens unit.

Moreover, an image forming lens system according to the present invention includes,
an aperture stop, and
an image-side lens unit group which is disposed on an image side of the aperture stop, wherein
the image-side lens unit group includes in order from the aperture stop to the image side along an optical axis, a first image-side lens unit having a negative refractive power, a second image-side lens unit having a positive refractive power, and a third image-side lens unit having a negative refractive power, and
any one of the first image-side lens unit, the second image-side lens unit, and the third image-side lens unit is a focusing lens unit which moves along the optical axis at the time of focusing from an object at infinity to an object at a close distance, and
the following conditional expression (2) is satisfied:

$$0.2 < f_{R1}/f_{R3} < 3.6 \qquad (2)$$

where,
$f_{R1}$ denotes a focal length of the first image-side lens unit, and
$f_{R3}$ denotes a focal length of the third image-side lens unit.

An image forming lens system according to the present invention includes,
an aperture stop, and
an image-side lens unit group which is disposed on an image side of the aperture stop, wherein
the image-side lens unit group includes in order from the aperture stop to the image side along an optical axis, a first image-side lens unit having a negative refractive power, a second image-side lens unit having a positive refractive power, and a third image-side lens unit having a negative refractive power, and
any one of the first image-side lens unit, the second image-side lens unit, and the third image-side lens unit is a focusing lens unit which moves along the optical axis at the time of focusing from an object at infinity to an object at a close distance, and
the following conditional expression (3) is satisfied:

$$0.08 < f_{R2}/f < 0.33 \qquad (3)$$

where,
$f_{R2}$ denotes a focal length of the second image-side lens unit, and
f denotes a focal length of the image forming lens system at the time of focusing at an object at infinity.

Moreover, an image pickup apparatus according to the present invention includes;
an optical system, and
an image pickup element which has an image pickup surface, and which converts an image formed on the image pickup surface by the optical system, to an electric signal, wherein
the optical system is one of the abovementioned image forming lens systems.

BRIEF DESCRIPTION OF THE DRAWINGS

FIG. 1A is a lens cross-sectional view of an image forming lens system according to an example 1, and FIG. 1B is a lens cross-sectional view of an image forming lens system according to an example 2;

FIG. 2A is a lens cross-sectional view of an image forming lens system according to an example 3, and FIG. 2B is a lens cross-sectional view of an image forming lens system according to an example 4;

FIG. 3A is a lens cross-sectional view of an image forming lens system according to an example 5, and FIG. 3B is a lens cross-sectional view of an image forming lens system according to an example 6;

FIG. 4A is a lens cross-sectional view of an image forming lens system according to an example 7, and FIG. 4B is a lens cross-sectional view of an image forming lens system according to an example 8;

FIG. 6A, FIG. 6B, FIG. 6C, and FIG. 6D are aberration diagrams at the time of focusing at an object at infinity of the image forming lens system according to the example 2, and FIG. 6E, FIG. 6F, FIG. 6G, and FIG. 6H are aberration diagrams at the time of focusing at an object at a close distance of the image forming lens system according to the example 2;

FIG. 11A, FIG. 11B, FIG. 11C, and FIG. 11D are aberration diagrams at the time of focusing at an object at infinity of the image forming lens system according to the example 7, and FIG. 11E, FIG. 11F, FIG. 11G, and FIG. 11H are aberration diagrams at the time of focusing at an object at a close distance of the image forming lens system according to the example 7;

DETAILED DESCRIPTION OF THE INVENTION

Figure 1A:
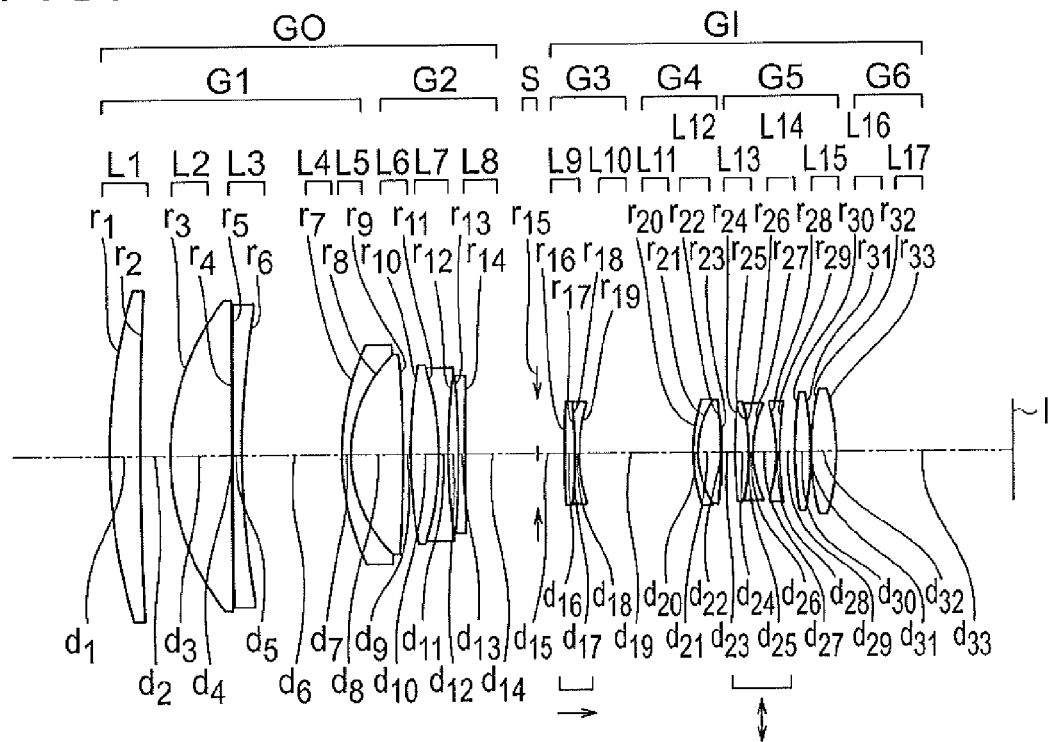
FIG. 1A and FIG. 1B are lens cross-sectional views at the time of focusing at an object at infinity of an image forming lens system according to the present invention, where.

Exemplary embodiments and examples of an image forming lens system and an image pickup apparatus using the same according to the present invention will be described below in detail by referring to the accompanying diagrams. However, the present invention is not restricted to the embodiments and the examples described below.

Prior to the description of the image forming lens system according to the present embodiment, a basic arrangement of the image forming lens system of the present embodiment will be described below. Moreover, in the following description, the 'image forming lens system' is appropriately referred to as a 'lens system'.

In the basic arrangement, the lens system includes an aperture stop, and an image-side lens unit group which is disposed on an image side of the aperture stop, and the image-side lens unit group includes in order from the aperture stop to the image side along an optical axis, a first image-side lens unit having a negative refractive power, a second image-side lens unit having a positive refractive power, and a third image-side lens unit having a negative refractive power, and any one of the first image-side lens unit, the second image-side lens unit, and the third image-side lens unit is a focusing lens unit which moves along the optical axis at the time of focusing from an object at infinity to an object at a close distance.

When an optical system is viewed as a whole, in a lens near the aperture stop, it is possible to make a lens diameter smallest. Here, the first image-side lens unit having a negative refractive power, the second image-side lens unit having a positive refractive power, and the third image-side lens unit having a negative refractive power are disposed on the image side of the aperture stop, and the image-side lens unit group is formed by these lens units. Moreover, a light beam that has passed through the aperture stop is relayed by the image-side lens unit group. Accordingly, since it is possible to suppress both of a central light beam and a peripheral light beam from spreading, and to make an increase in a diameter of the light beam passed through the aperture stop small, it is possible to form the image-side lens unit group having a small diameter efficiently. As a result of this, it becomes easy to make a diameter of the overall lens system small.

Moreover, since it is possible to make the diameter of the image-side lens unit group small, each of the first image-side lens unit, the second image-side lens unit, and the third image-side lens unit becomes a small-size lens unit. Therefore, by carrying out focusing upon letting any one of these lens units to be the focusing lens unit, it is possible to carry out focusing by a lens unit having a small diameter. As a result of this, it is possible to make the focusing lens unit light-weight.

Moreover, even if any one of the first image-side lens unit, the second image-side lens unit, and the third image-side lens unit islet to be the focusing lens unit, a lens unit having a refractive power which has a sign different from a sign of a refractive power of the focusing lens unit is disposed near the focusing lens unit. Accordingly, since it is possible to enhance a magnification of the focusing lens unit, it is possible to achieve an arrangement which improves a focusing sensitivity easily. For instance, in a case in which, the first image-side lens unit is let to be the focusing lens unit, a lens unit that is near the focusing lens unit is the second image-side lens unit. Here, since the refractive power of the focusing lens unit is a negative refractive power, and the refractive power of the lens unit disposed near the focusing lens unit is a positive refractive power, it is possible to enhance the magnification of the focusing lens unit.

An image forming lens system according to a first embodiment has the abovementioned basic arrangement, and also the following conditional expression (1) is satisfied:

$$0.06 < |f_{fo}/f| < 0.4 \tag{1}$$

where, f denotes a focal length of the image forming lens system at the time of focusing at an object at infinity, and $f_{fo}$ denotes a focal length of the focusing lens unit.

When falling below a lower limit value of conditional expression (1), since the refractive power of the focusing lens unit becomes excessively large, an amount of a spherical aberration that occurs becomes large mainly. Therefore, a favorable imaging performance is not achieved at the time of focusing. Moreover, since correcting the increased spherical aberration favorably leads to an increase in the number of lenses, making the focusing lens unit light-weight becomes difficult.

When exceeding an upper limit value of conditional expression (1), an amount of movement of the focusing lens unit increases. In this case, a space which is necessary for the movement of the focusing lens unit at the time of focusing becomes large, and when an attempt is made to secure this space sufficiently, an overall length of the image-side lens unit group becomes long. As a result of this, shortening the overall length of the overall lens system becomes difficult.

An image forming lens system according to a second embodiment has the abovementioned basic arrangement, and also the following conditional expression (2) is satisfied:

$$0.2 < f_{R1}/f_{R3} < 3.6 \tag{2}$$

where, $f_{R1}$ denotes a focal length of the first image-side lens unit, and $f_{R3}$ denotes a focal length of the third image-side lens unit.

When falling below a lower limit value of conditional expression (2), spreading of a light beam that has passed through the first image-side lens unit becomes large. Accordingly, thinning a diameter of the second image-side lens unit and a diameter of the third image-side lens unit that are disposed subsequent to the first image-side lens unit becomes difficult.

When exceeding an upper limit value of conditional expression (2), the refractive power of the first image-side lens unit becomes small. Accordingly, in a case of focusing by the first image-side lens unit, an amount of movement of the first lens unit increases. In this case, a space which is necessary for the movement of the first lens unit at the time of focusing becomes large, and when an attempt is made to secure this space sufficiently, the overall length of the image-side lens unit group becomes long. As a result, shorting the overall length of the overall lens system becomes difficult.

Moreover, by the refractive power of the first image-side lens unit becoming small, there is an increase in a proportion of load of refractive power on the second image-side lens unit and the third image-side lens unit that are disposed subsequent to the first image-side lens unit. In this case, an effect of correction of mainly the spherical aberration in the first image-side lens unit becomes small, whereas, an effect of correction in the second image-side lens unit and the third image-side lens unit becomes excessively large. Therefore, in a case of focusing by the second image-side lens unit or the third image-side lens unit, the spherical aberration becomes even worse due to focusing.

An image forming lens system according to a third embodiment has the abovementioned basic arrangement, and also the following conditional expression (3) is satisfied:

$$0.08 < f_{R2}/f < 0.33 \tag{3}$$

where, $f_{R2}$ denotes a focal length of the second image-side lens unit, and f denotes a focal length of the image forming lens system at the time of focusing at an object at infinity.

When falling below a lower limit value of conditional expression (3), the refractive power of the second image-side lens unit with respect to the focal length of the overall image forming lens system becomes excessively large. Accordingly, securing an appropriate back focus becomes difficult.

When exceeding an upper limit value of conditional expression (3), an effect of convergence of a light beam after passing through the second image-side lens unit is reduced. Accordingly, thinning a diameter of lens units from the third image-side lens unit onward, disposed subsequent to the second image-side lens unit, becomes difficult.

Moreover, in the image forming lens systems according to the first embodiment, the second embodiment, and the third embodiment (hereinafter, referred to as a preferable aspect of the present invention), it is desirable that the following conditional expression (1) is satisfied:

$$0.06 < |f_{fo}/f| < 0.4 \tag{1}$$

where, f denotes a focal length of the image forming lens system at the time of focusing at an object at infinity, and $f_{fo}$ denotes a focal length of the focusing lens unit.

Since a technical significance of conditional expression (1) has already been explained, description thereof is omitted.

Moreover, according to a preferable aspect of the present invention, it is desirable that the following conditional expression (2) is satisfied:

$$0.2 < f_{R1}/f_{R3} < 3.6 \tag{2}$$

where, $f_{R1}$ denotes a focal length of the first image-side lens unit, and $f_{R3}$ denotes a focal length of the third image-side lens unit.

Since a technical significance of conditional expression (2) has already been explained, description thereof is omitted.

Moreover, according to a preferable aspect of the present invention, it is desirable that the following conditional expression (3) is satisfied:

$$0.08 < f_{R2}/f < 0.33 \tag{3}$$

where, $f_{R2}$ denotes a focal length of the second image-side lens unit, and f denotes a focal length of the image forming lens system at the time of focusing at an object at infinity.

Since a technical significance of conditional expression (3) has already been explained, description thereof is omitted.

Moreover, according to a preferable aspect of the present embodiment, it is desirable that any one of the first image-side lens unit, the second image-side lens unit, and the third image-side lens unit is an image-motion correcting lens unit, and the image-motion correcting lens unit moves in a direction different from a direction of the optical axis to reduce an image motion due to shaking of the image forming lens system.

According to the abovementioned basic arrangement, in any one of the first image-side lens unit, the second image-side lens unit, and the third image-side lens unit, it is possible to improve a sensitivity of shifting an image plane by shifting the lens unit (hereinafter, referred to as sensitivity of image-motion correction) in a direction different from a direction of the optical axis. Therefore, by letting any one of the first image-side lens unit, the second image-side lens unit, and the third image-side lens unit to be the image-motion correcting lens unit, and shifting the image-motion correcting lens unit in a direction different from the direction of the optical axis, it is possible to achieve a high image-motion correction sensitivity.

Moreover, according to a preferable aspect of the present invention, it is desirable that the image-side lens unit group includes a fourth image-side lens unit having a positive refractive power, which is disposed on the image side of the third image-side lens unit, immediately after the third image-side lens unit.

Accordingly, it is possible to enhance a magnification of the third image-side lens unit. As a result of this, in a case in which, the third image-side lens unit is let to be the focusing lens unit or the image-motion correcting lens unit, it is possible to improve efficiently the focusing sensitivity in the focusing lens unit or the image-motion correction sensitivity in the image-motion correcting lens unit.

Moreover, according to a preferable aspect of the present invention, it is desirable that anyone of the first image-side lens unit, the second image-side lens unit, and the third image-side lens unit is the focusing lens unit, and another one of the first image-side lens unit, the second image-side lens unit, and the third image-side lens unit is the image-motion correcting lens unit.

By the arrangements of the aforementioned first embodiment, second embodiment, and third embodiment, it is possible to improve the focusing sensitivity and the image-motion correction sensitivity (sensitivity of shifting the image plane by shifting the lens unit) in the first image-side lens unit, the second image-side lens unit, and the third image-side lens unit.

Therefore, in a case in which, the focusing is carried out by any one of the first image-side lens unit, the second image-side lens unit, and the third image-side lens unit, it is possible to achieve a high focusing sensitivity. As a result of this, it is possible to form a focusing lens unit having a thin diameter and with a small amount of movement of lenses.

Moreover, in a case in which, the shifting is carried out by anyone of the first image-side lens unit, the second image-side lens unit, and the third image-side lens unit, a high image-motion correction sensitivity is achieved. As a result of this, it is possible to form an image-motion correcting lens unit having a thin diameter and with a small amount of movement of lenses.

For these reasons, it is preferable to let any one of the first image-side lens unit, the second image-side lens unit, and the third image side lens unit to be the focusing lens unit, and to let any one of the remaining lens units to be the image-motion correcting lens unit. Accordingly, it is possible to dispose the focusing lens unit and the image-motion correcting lens unit in the image-side lens unit group having a thin diameter. As a result of this, it is possible to achieve small-sizing of a focusing unit and an image-motion correcting unit. The focusing unit is an arrangement which includes for example, a focusing lens unit and a moving mechanism. Moreover, the image-motion correcting unit is an arrangement which includes for example, an image-motion correcting unit and a moving mechanism.

Moreover, according to a preferable aspect of the present invention, it is desirable that the image forming lens system includes an object-side lens unit group which is disposed on an object side of the aperture stop, and the object-side lens unit group includes a plurality of lenses, and has a positive refractive power, and all the lenses disposed on the object side of the aperture stop are included in the object-side lens unit group, and an object-side partial lens system which includes all the lenses on the object side of the first image-side lens unit has a positive refractive power.

Accordingly, lens units having a positive refractive power (the object-side lens unit group or the object-side partial lens system) are disposed adjacent to the first image-side lens unit. Therefore, in a case in which, the first image-side lens unit is let to be the focusing lens unit or the image-motion correcting lens unit, it becomes easier to improve the focusing sensitivity of the focusing lens unit or the image-motion correction sensitivity of the image-motion correcting lens unit.

Moreover, according to a preferable aspect of the present invention, it is desirable that the focusing lens unit is the first image-side lens unit.

As aforementioned, it is desirable to impart a positive refractive power to a lens unit positioned on the object side of the image-side lens unit group, for example, the object-side lens unit group. By making such an arrangement, by the object-side lens unit group having a positive refractive power and a lens unit having a negative refractive power which is disposed in the image-side lens unit group, it is possible to position a principal point on the object side. As a result of this, shortening the overall length of the lens system becomes easier.

Moreover, by making such an arrangement, it is possible to enhance an effect that is attributed to a telephoto arrangement (hereinafter, appropriately referred to as 'effect due to the telephoto arrangement'). As a result of this, shortening the overall length of the lens system becomes easier.

Moreover, according to a preferable aspect of the present invention, it is desirable that anyone of the first image-side lens unit and the third image-side lens unit is either the focusing lens unit or the image-motion correcting lens unit.

Lens unit having a negative refractive power in the image-side lens unit group, or in other words, the first image-side lens unit and the third image-side lens unit are disposed at positions at which, a light beam tends to be converged. For this reason, the first image-side lens unit and the third image-side lens unit have a small diameter among the image-side lens units in the image-side lens unit group. Therefore, by carrying out either focusing or image-motion correction (such as image stabilization) by any one of the first image-side lens unit and the third image-side lens unit, a lens unit for which, lens weight is lighter, is to be moved. As a result of this, since it is possible to drive a lens unit which is lighter in weight, making the lens unit and a mechanism which drives the lens unit light-weight is facilitated.

Moreover, an involvement of an axial marginal light ray in the refractive power of the overall lens system increases in proportion to a height of the axial marginal light ray. In other words, the higher the height of the axial marginal light ray, more is the involvement in the refractive power. Here, for further improving the focusing sensitivity of the focusing lens unit, it is necessary to make the refractive power of the focusing lens unit large. Therefore, it is preferable to use a lens unit for which, the height of axial marginal light ray travels at a high position, as the focusing lens unit. By making such an arrangement, since a need to make the refractive power of the focusing lens unit large forcedly is not there anymore, it is possible to secure more efficiently the refractive power necessary for the focusing lens unit. The height of the axial marginal light ray is high immediately after a diaphragm. Therefore, it is preferable to carry out focusing by the first image-side lens unit which is a lens unit immediately after the diaphragm.

Moreover, according to a preferable aspect of the present invention, it is desirable that the first image-side lens unit is the focusing lens unit.

When shortening the overall length of the lens system is taken into consideration, it is preferable to let the refractive power of a lens unit positioned on the object side of the focusing lens unit to be a positive refractive power, and a refractive power of the focusing lens unit to be a negative refractive power. Since making such an arrangement leads to enhance further the effect due to the telephoto arrangement, such an arrangement is effective in shortening the overall length of the lens system.

By letting the first image-side lens unit to be the focusing lens unit, the refractive power of the focusing lens unit becomes a negative refractive power. Therefore, since it is possible to enhance further the effect due to the telephoto arrangement, it is possible to shorten the overall length of the lens system. Moreover, by such arrangement, since it is possible to dispose the focusing lens unit at a position at which, a light ray is converged gradually, it is possible to make a lens diameter small in the focusing lens unit. As a result of this, it is possible to make the focusing unit small-sized and light-weight.

Moreover, according to such arrangement, even when the refractive power of the focusing lens unit is made large, since the second image-side lens unit is disposed on the image side of the focusing lens unit, it is possible to make small diverging of a light ray after the light ray has passed through the focusing lens unit, by the positive refractive power of the second image-side lens unit. As a result of this, it is possible to make the diameter of the overall image-side lens unit group small while improving the focusing sensitivity. Moreover, accordingly, as it is possible to make an amount of movement of a lens unit small at the time of focusing and to make the diameter of the lens system small, it is possible to make the focusing unit small-sized and light-weight.

As aforementioned, since the lens unit having a positive refractive power is disposed on the image side of the focusing lens unit, it is possible to improve the focusing sensitivity more easily. Moreover, by letting the first image-side lens unit disposed on the image side of the diaphragm unit, immediately next to the diaphragm unit, to be the focusing lens unit, enhancing the magnification of the focusing lens unit becomes easy. Accordingly, it is possible to further improve the focusing sensitivity, and to make the focusing lens unit small-sized and light-weight.

Moreover, the aperture stop can be deemed as one of the components that forms the image-side lens unit group, and can be deemed as a component that is independent of the object-side lens unit group and the image-side lens unit group. In the latter case, the aperture stop becomes an element which forms a diaphragm unit. There might be a case in which, the diaphragm unit includes only the aperture stop, or includes the aperture stop and other optical element such as a lens.

Moreover, according to a preferable aspect of the present invention, it is desirable that the focusing lens unit includes not more than two lenses.

As aforementioned, the height of the axial marginal light ray is high in the first image-side lens unit. Therefore, by letting the first image-side lens unit to be the focusing lens unit, a need to make the refractive power of the focusing lens unit large forcedly is not there anymore. As a result of this, mainly the spherical aberration and the coma aberration are to be corrected favorably in the focusing lens unit. In such manner, since types of aberrations to be corrected in the focusing lens unit being few, it is possible to form the focusing lens unit by not more than two lenses.

Moreover, by forming the focusing lens unit by not more than two lenses, which is a small number of lenses, it is possible to make the focusing lens unit light-weight. Therefore, it is possible to make a focusing speed high.

Moreover, according to a preferable aspect of the present invention, it is desirable that the focusing lens unit consists of one positive lens and one negative lens.

By forming the focusing lens unit by one positive lens and one negative lens, it is possible to reduce occurrence of the chromatic aberration in the focusing lens unit. As a result, it is possible to secure stable focusing performance at the time of focusing. Moreover, by carrying out the correction of chromatic aberration by the minimum number lenses which is two, it is possible to achieve both of securing the improved focusing performance and making the focusing lens unit light-weight.

Moreover, according to a preferable aspect of the present invention, it is desirable that the image-motion correcting lens unit includes a plurality of lenses and a predetermined lens, and the plurality of lenses have a refractive power having a sign same as the sign of the refractive power of the image-motion correcting lens unit, and the predetermined lens has a refractive power having a sign different from the sign of the refractive power of the image-motion correcting lens unit.

Aberrations which occur when there is a shaking are mainly, the spherical aberration, a curvature of field, and a chromatic aberration of magnification. For reducing degradation of correction performance with respect to the shaking, it is necessary to reduce an amount of the aberrations which occur. Here, in the image-motion correcting lens unit, since a proportion of load of the refractive power being large (the refractive power being large), the aberration is susceptible to occur.

Therefore, the image-motion correcting lens unit is formed by the plurality of lenses and the predetermined lens. Moreover, by the plurality of lenses having the refractive power having a sign same as the sign of the refractive power of the image-motion correcting lens unit, it is possible to reduce occurrence of the spherical aberration and the curvature of field. Furthermore, by the predetermined lens having the refractive power having a sign different from the sign of the refractive power of the image-motion correcting lens unit, it is possible to correct the chromatic aberration favorably.

Furthermore, it is desirable to let the number of the plurality of lenses to be two and the number of the predetermined lenses to be one, and to form the image-motion correcting lens unit by a total of three lenses.

Moreover, according to a preferable aspect of the present invention, it is desirable that the image-side lens unit group includes in order from the aperture stop to the image side, the first image-side lens unit, the second image-side lens unit, the third image-side lens unit, and a fourth image-side lens unit, and the first image-side lens unit is the focusing lens unit, and the third image-side lens unit is an image-motion correcting lens unit which moves in a direction different from a direction of the optical axis to reduce an image motion due to shaking of the image forming lens system.

When shortening the overall length of the lens system is taken into consideration, it is necessary to enhance the effect due to the telephoto arrangement even in the image-side lens unit group. For enhancing the effect due to the telephoto arrangement, it is preferable that a lens system on the object side of the focusing lens unit has a positive refractive power, and to let the focusing lens unit to have a negative refractive power. Here, since the second image-side lens unit has a positive refractive power, letting the first image-side lens unit to be the focusing lens unit is effective as it enhances further the effect due to the telephoto arrangement.

Moreover, since the first image-side lens unit, or in other words, the focusing lens unit is disposed near the aperture stop, it is possible to dispose the focusing lens unit at a position at which, a light ray is converged gradually. Therefore, it is possible to make a lens diameter small in the focusing lens unit. As a result of this, it is possible to make the focusing unit small-sized and light-weight.

Moreover, since the second image-side lens unit has a positive refractive power, even when the negative refractive power of the focusing lens unit (the first image-side lens unit) is made large, it is possible to make small the diverging of a light ray after the light ray has passed through the focusing lens unit. As a result of this, it is possible to make the diameter of the overall image-side lens unit group small while improving the focusing sensitivity. Moreover, accordingly, by being able to make the diameter of the lens unit small and to make the amount of movement of the lens unit at the time of focusing small, it is all the more possible to make the focusing lens unit small-sized and light-weight.

Moreover, by disposing the second image-side lens unit on the image side of the focusing lens unit, a lens unit having a refractive power having a sign different from a sign of the focusing lens unit is disposed near the focusing lens unit. Therefore, it is possible to improve the focusing sensitivity of the focusing lens unit more easily.

In the image-motion correction, the image-motion correcting lens unit is shifted. For the image-motion correction, it is preferable to make the amount of movement of the image-motion correcting lens unit small (to narrow a range of movement). For making the amount of movement small, it is desirable to let a lens unit (lens) having a smaller lens diameter to be the image-motion correcting lens unit. By letting the refractive power of the image-motion correcting lens unit to be a negative refractive power, it is possible to adopt an optical lay out in which, it is easy to make the lens diameter of the image-motion correcting lens unit small, and therefore it is preferable.

Moreover, the second image-side lens unit is disposed on the object side of the image-motion correcting lens unit, and the fourth image-side lens unit is disposed on the image side of the image-motion correcting lens unit. Accordingly, since a lens unit having a positive refractive power is disposed on both sides of the image-motion correcting lens unit, it is possible to make the positive refractive power of the image-motion correcting lens unit large. As a result of this, it is possible to make large an amount of shift of an imaging position with respect to an amount of shift of the image-motion correcting lens unit. Accordingly, it is possible to carry out correction of image-motion with higher accuracy with a small amount of shift.

Meanwhile, the coma occurs due to shifting of the image-motion correcting lens unit. Therefore, if the focusing lens unit is disposed on the image side of the image-motion correcting lens unit, an effect of correction of the coma fluctuates substantially due to focusing. Therefore, it is not preferable to dispose the focusing lens unit on the image side of the image-motion correcting lens unit.

Moreover, a lens unit having a positive refractive power which is disposed on the object side of the image-motion correcting lens unit is the second image-side lens unit which is disposed on the image side of the focusing lens unit. In such manner, if the lens unit disposed on the object side of the image-motion correcting lens unit and the lens unit disposed on the image side of the focusing lens unit are let to be common, it is possible to make an optical layout of the rear lens unit simple.

Furthermore, by disposing the whole image-side lens unit groups on the image side of the aperture stop, it is possible to make the diameter of the image-side lens unit group small.

Moreover, aberrations which occur at the time of focusing are mainly the spherical aberration and the longitudinal chromatic aberration. For reducing degradation of the focusing performance, it is necessary to reduce an amount of these aberrations which occur. Therefore, it is desirable that the focusing lens unit includes at least a positive lens and a negative lens. Furthermore, an aberration that has occurred in the focusing lens unit is relayed by the second image-side lens unit. Therefore, it is desirable that the second image-side lens unit also includes a positive lens and a negative lens.

Moreover, aberrations which occur when there is a shaking are mainly, the spherical aberration, the curvature of field, and the chromatic aberration of magnification. For reducing degradation of correction performance with respect to the shaking, it is necessary to reduce an amount of the aberrations which occur. Here, in the image-motion correcting lens unit, since the proportion of load of the refractive power being large (the refractive power being large), the aberration is susceptible to occur.

Therefore, a plurality of negative lenses is used in the image-motion correcting lens unit, and the negative refractive power of the image-motion correcting lens unit is divided into these negative lenses. By making such an arrangement, it is possible to reduce an occurrence of the spherical aberration and a curvature of field. Furthermore, a positive lens is used in the image-motion correcting lens unit, and by the positive lens and the negative lenses, it is possible to correct the chromatic aberration favorably. For correction of these aberrations, it is desirable that the image-motion correcting lens unit includes at least one positive lens and two negative lenses.

Moreover, it is desirable that the focusing lens unit includes two lenses, the second image-side lens unit includes not more than two lenses, and the image-motion correcting lens unit includes three lenses. Accordingly, it is possible to achieve a lens system in which, the number of lenses is small and focusing performance and correction performance with respect to image motion are favorable.

Moreover, according to a preferable aspect of the present invention, it is desirable to include an image-motion correcting lens unit which satisfies the following conditional expression (4):

$$0.8 < |MG_{ISback} \times (MG_{IS}-1)| < 5.0 \quad (4)$$

where, $MG_{IS}$ denotes a lateral magnification of the image-motion correcting lens unit in an arbitrary focused state, and $MG_{ISback}$ denotes a lateral magnification of an overall optical system between the image-motion correcting lens unit and the image plane, in an arbitrary focused state.

When falling below a lower limit value of conditional expression (4), an effect of image-motion correction by shifting the image-motion correcting lens unit is not achieved sufficiently. When exceeding an upper limit value of conditional expression (4), since a proportion of load of the refractive power on the image-motion correcting lens unit becomes large, degradation of the correction performance with respect to the shaking becomes large.

Moreover, according to a preferable aspect of the present invention, it is desirable that the focusing lens unit satisfies the following conditional expression (5):

$$1.5 < |(MG_{foback})^2 \times \{(MG_{fo})^2 - 1\}| < 8.0 \quad (5)$$

where, $MG_{fo}$ denotes a lateral magnification of the focusing lens unit in an arbitrary focused state, and $MG_{foback}$ denotes a lateral magnification of the overall optical system between the focusing lens unit and the image plane, in an arbitrary focused state.

When falling below a lower limit value of conditional expression (5), since the amount of movement of the focusing lens unit become excessively large, shortening the overall length of the lens system becomes difficult. When exceeding an upper limit value of conditional expression (5), since a position control of the focusing lens unit becomes difficult, it is not possible to carry out an accurate focusing.

Moreover, according to a preferable aspect of the present invention, it is desirable that an optical system which includes all lenses on the object side of the focusing lens unit has a positive refractive power that satisfies the following conditional expression (6):

$$-4.5 < f_{FA}/f_{fo} < -1.5 \quad (6)$$

where, $f_{FA}$ denotes a focal length of the optical system which includes all the lenses on the object side of the focusing lens unit, and $f_{fo}$ denotes a focal length of the focusing lens unit.

By letting the refractive power of the optical system which includes all lenses on the object side of the focusing lens unit to be a positive refractive power, and the refractive power of the focusing lens unit to be a negative refractive power, since it is possible to enhance the effect due to the telephoto arrangement in the overall lens system, it is possible to shorten the overall length of the lens system.

When falling below a lower limit value of conditional expression (6), the refractive power of the focusing lens unit becomes excessively large. In this case, since the spherical aberration that occurs in the focusing lens unit increases, a favorable performance is not achieved in the overall area of the focusing range.

When exceeding an upper limit value of conditional expression (6), the refractive power of the focusing lens unit becomes excessively small. In this case, since the focusing sensitivity is degraded, the amount of movement of the focusing lens unit at the time of focusing increases. As a result of this, shortening the overall length of the lens system becomes difficult.

Moreover, according to a preferable aspect of the present invention, it is desirable that the lens units other than the focusing lens unit in the image-side lens unit group do not move in the optical axial direction.

The arrangement of the image-side lens unit group in the lens system according to the present embodiment is an arrangement appropriate for making the diameter of the focusing lens unit or the diameter of the image-motion correcting lens unit small, and for disposing these lens units efficiently. By the way, in a zooming optical system, since the zooming is carried out by a movement a lens unit, an aberration is susceptible to fluctuate according to the movement of the lens unit. Therefore, the image forming lens system is let to be an optical system in which, a lens unit is not to be moved for zooming. By making such an arrangement, it is not necessary anymore, to take into account the correction of a fluctuation in various aberrations that occur due to the movement of the lens unit at the time of zooming, such as a fluctuation in the spherical aberration and a fluctuation in an astigmatism, in the image-side lens unit group. Accordingly, since it is possible to prevent an increase in a space for movement and an increase in the number of lenses in the image-side lens unit group, it is possible to form the image-side lens unit group of even smaller size.

Moreover, according to a preferable aspect of the present invention, it is desirable that a plurality of lenses is disposed on the object side of the image-side lens unit group, and positions of all of the plurality of lenses disposed on the object side of the image-side lens unit group are fixed.

By making such an arrangement, a lens unit which is positioned on the object side of the image-side lens unit group, such as the object-side lens unit group, does not include a lens which moves. By making such an arrangement, it is possible to eliminate fluctuation in an imaging performance due to focusing, zooming, and image-motion correction in the object-side lens unit group. Particularly, the height of a light ray being high in the object-side lens unit group, the imaging performance is degraded if a lens is moved. Therefore, by making an arrangement such that the focusing and image-motion correction are carried out in the image-side lens unit group, it is possible to maintain more favorable imaging performance.

Moreover, according to a preferable aspect of the present invention, it is desirable that the image forming lens system is a single focal length lens system with a fixed focal length in a state of focused at an object at infinity.

Accordingly, it is possible to facilitate making the lens system to be even smaller-sized and light-weight.

Moreover, according to a preferable aspect of the present invention, it is desirable that the first image-side lens unit is the focusing lens unit, and a lens having a positive refractive power is disposed on the object side of the first image-side lens unit, at a position adjacent to the aperture stop, and there is no other lens between the first image-side lens unit and the lens unit having a positive refractive power.

Accordingly, in a case in which, a lens unit positioned on the object side of the image-side lens unit group, such as the object-side lens unit group, has a positive refractive power, even without disposing a lens in the diaphragm unit, it is possible to improve the focusing sensitivity of the first image-side lens unit easily by the aforementioned basic arrangement. Furthermore, since it is possible to strengthen the telephoto arrangement by the object-side lens unit group and the first image-side lens unit, shortening the overall length of the lens system becomes easy.

Moreover, according to the aforementioned basic arrangement, since it is possible to improve the focusing sensitivity of the first image-side lens unit easily, by disposing a lens unit having a positive refractive power in the diaphragm unit which is disposed on the object side of the first image-side lens unit, it is possible to improve the focusing sensitivity of the first image-side lens unit.

Moreover, according to a preferable aspect of the present invention, it is desirable that the first image-side lens unit is the image-motion correcting lens unit, and a lens unit having a positive refractive power is disposed on the object side of the first image-side lens unit, at a position adjacent to the aperture stop, and there is no other lens between the first image-side lens unit and the lens unit having a positive refractive power.

Accordingly, in a case in which, a lens unit positioned on the object side of the image-side lens unit group, such as the object-side lens unit group, has a positive refractive power, even without disposing a lens in the diaphragm unit, it is possible to improve the focusing sensitivity of the first image-side lens unit easily by the aforementioned basic arrangement. Furthermore, since it is possible to strengthen the telephoto arrangement by the object-side lens unit group and the first image-side lens unit, shortening the overall length of the lens system becomes easy.

Moreover, according to the aforementioned basic arrangement, it is possible to improve easily the image-motion correction sensitivity of the first image-side lens unit, and by disposing a lens unit having a positive refractive power in the diaphragm unit which is disposed on the object side of the first image-side lens unit, it is possible to improve further the image-motion correction sensitivity of the first image-side lens unit.

Moreover, according to a preferable aspect of the present invention, it is desirable that the following conditional expression (7) is satisfied:

$$0 \leq |f/r_{G2b}| < 7.0 \tag{7}$$

where, f denotes the focal length of the image forming lens system at the time of focusing at an object at infinity, and $r_{G2b}$ denotes a paraxial radius of curvature of a lens surface on the object side of the focusing lens unit, immediately before the focusing lens unit.

When exceeding an upper limit value of conditional expression (7), an amount of occurrence of the spherical aberration and the coma increases at a lens surface immediately before the object side of the focusing lens unit. Since an effect of correction of these aberrations affect the focusing lens unit, it is not possible to secure a stable imaging performance at the time of focusing. Moreover, the lens surface on the object side of the focusing lens unit, immediately before the focusing lens unit, is a lens surface which is positioned on the object side of the focusing lens unit, and is a lens surface which is positioned nearest to the focusing lens unit.

Moreover, according to a preferable aspect of the present invention, it is desirable that the following conditional expression (8) is satisfied:

$$0.5 \leq \phi_{fo}/\phi_{La} \leq 0.92 \tag{8}$$

where, $\phi_{fo}$ denotes a maximum effective aperture from among effective apertures of lenses in the focusing lens unit, and $\phi_{La}$ denotes a maximum effective aperture of a lens positioned nearest to the image in the image forming lens system.

When exceeding a lower limit value of conditional expression (8), it is possible to suppress the refractive power of the focusing lens unit from becoming large, and to reduce the number of lenses in the focusing lens unit. As a result, it is possible to make the focusing lens unit light-weight. When falling below an upper limit value of conditional expression (8), it is possible to suppress the refractive power of the focusing lens unit from becoming excessively small, and to make the diameter of the focusing lens unit small. Moreover, it is possible to make the amount of movement of the focusing lens unit at the time of focusing small. As a result, it is possible to make the focusing unit small, to shorten the overall length of the optical system, and also to make a diameter of a lens frame small.

Moreover, in a case in which, the focusing lens unit includes a plurality of lenses, $\phi_{fo}$ is a maximum effective aperture from among effective apertures of surfaces of lenses. Moreover, a lens positioned nearest to the image has an object-side surface and an image-side surface. Therefore, $\phi_{La}$ is a maximum effective aperture from among an effective aperture of the object-side surface and an effective aperture of the image-side surface.

Moreover, according to a preferable aspect of the present invention, it is desirable that the following conditional expression (9) is satisfied:

$$0.023 \leq D_{sfo}/D_{LTL} \leq 0.110 \tag{9}$$

where, $D_{sfo}$ denotes a distance on the optical axis from the aperture stop up to a lens surface nearest to an object of the focusing lens unit, $D_{LTL}$ denotes a distance on the optical axis from a lens surface nearest to the object of the image forming lens system up to an image plane, and both $D_{sfo}$ and $D_{LTL}$ are distances at the time of focusing at an object at infinity.

In the lens system according to the present embodiment, a light beam is converged by using a positive refractive power of a lens unit which is positioned before the aperture stop. When exceeding a lower limit value of conditional expression (9), it is possible to achieve sufficiently an effect of converging the light beam. Therefore, it is possible to suppress the diameter of the focusing lens unit from becoming large. When falling below an upper limit value of conditional expression (9), it is possible to shorten the overall length of the optical system.

Moreover, according to a preferable aspect of the present invention, it is desirable that the following conditional expression (10) is satisfied:

$$0.2 \leq D_{sfo}/\Phi_s \leq 0.8 \tag{10}$$

where, $D_{sfo}$ denotes the distance on the optical axis from the aperture stop up to a lens surface nearest to an object of the focusing lens unit, and is a distance at the time of focusing at an object at infinity, and $\Phi_s$ denotes a maximum diameter of the aperture stop.

In the lens system according to the present embodiment, a light beam is converged by using a positive refractive power of a lens unit which is positioned before the aperture stop. When exceeding a lower limit value of conditional expression (10), it is possible to achieve sufficiently an effect of converging the light beam. Therefore, it is possible to make the diameter of the focusing lens unit small. When falling below an upper limit value of conditional expression (10), it is possible to shorten the overall length of the optical system.

Moreover, according to a preferable aspect of the present invention, it is desirable that an optical system positioned on the image side of the focusing lens unit includes at least two positive lenses and one negative lens.

If the small-sizing of the focusing lens unit is carried out, the refractive power of the focusing lens unit becomes large. Therefore, in the focusing lens unit, the amount of occurrence of the spherical aberration, the longitudinal chromatic aberration, and the astigmatism tends to increase mainly. Here, the optical system positioned on the image side of the focusing lens unit has a positive refractive power. For suppressing a fluctuation in these aberrations at the time of focusing, it is preferable to make the amount of occurrence of these aberrations small in the optical system on the image side of the focusing lens unit.

The optical system positioned on the image side of the focusing lens unit is formed by one positive lens and one negative lens. At this time, by making Abbe number for the negative lens to be smaller than Abbe number for the positive lens, it is possible to suppress the occurrence of the chromatic aberration and the spherical aberration. Moreover, by using one more positive lens, it is possible to suppress the occurrence of the astigmatism easily. Moreover, for making the occurrence of these aberrations even smaller, it is preferable that the optical system positioned on the image side of the focusing lens unit includes at least two positive lenses.

An image pickup apparatus according to the present invention includes an optical system, and an image pickup element which has an image pickup surface, and which converts an image formed on the image pickup surface by the optical system, to an electric signal, and the optical system is the aforementioned image forming lens system.

Accordingly, it is possible to provide an image pickup apparatus including an image forming lens system which has a superior mobility, and in which, aberrations are corrected favorably.

For each conditional expression, it is preferable to let the upper limit value and the lower limit value as given below, as it will show the effect more assuredly.

For conditional expression (1), it is more preferable to let the lower limit value to be 0.08, and 0.1 is even more preferable.

Moreover, for conditional expression (1), it is more preferable to let the upper limit value to be 0.35, and 0.25 is even more preferable.

For conditional expression (2), it is more preferable to let the lower limit value to be 0.6.

Moreover, for conditional expression (2), it is more preferable to let the upper limit value to be 3.3.

For conditional expression (3), it is more preferable to let the lower limit value to be 0.13.

Moreover, for conditional expression (3), it is more preferable to let the upper limit value to be 0.3.

For conditional expression (4), it is more preferable to let the lower limit value to be 1.3.

Moreover, for conditional expression (4), it is more preferable to let the upper limit value to be 3.5.

For conditional expression (5), it is more preferable to let the lower limit value to be 2.5.

Moreover, for conditional expression (5), it is more preferable to let the upper limit value to be 6.5.

For conditional expression (6), it is more preferable to let the lower limit value to be −4.0, and −3.5 is even more preferable.

Moreover, for conditional expression (6), it is more preferable to let the upper limit value to be −1.7, and −1.8 is even more preferable.

For conditional expression (7), it is more preferable to let the upper limit value to be 6.5. It is even more preferable to let the upper limit value to be 4.0, and 2.0 is all the more preferable.

For conditional expression (8), it is more preferable to let the lower limit value to be 0.6.

Moreover, for conditional expression (8), it is more preferable to let the upper limit value to be 0.88, and 0.85 is even more preferable.

For conditional expression (9), it is more preferable to let the lower limit value to be 0.025, and 0.04 is even more preferable.

Moreover, for conditional expression (9), it is more preferable to let the upper limit value to be 0.1, and 0.090 is even more preferable.

For conditional expression (10), it is more preferable to let the lower limit value to be 0.3, and 0.45 is even more preferable.

Moreover, for conditional expression (10), it is more preferable to let the upper limit value to be 0.75, and 0.7 is even more preferable.

Moreover, the aforementioned image forming lens system and the image pickup apparatus may satisfy the plurality of arrangements simultaneously. Making such an arrangement is preferable for achieving a favorable image forming lens system and an image pickup apparatus. Moreover, combinations of preferable arrangements are arbitrary. Moreover, for each conditional expression, only an upper limit value or a lower limit value of a numerical range of a conditional expression further restricted may be restricted.

Examples from an example 1 to an example 8 of the image forming lens system will be described below. Lens cross-sectional views at the time of focusing at an object at infinity of the examples from the example 1 to the example 8 are shown in FIG. 1A, FIG. 1B, FIG. 2A, FIG. 2B, FIG. 3A, FIG. 3B, FIG. 4A, and FIG. 4B.

In these lens cross-sectional diagrams, a first lens unit is denoted by G1, a second lens unit is denoted by G2, a third lens unit is denoted by G3, a fourth lens unit is denoted by G4, a fifth lens unit is denoted by G5, a sixth lens unit is denoted by G6, a seventh lens unit is denoted by G7, an aperture stop is denoted by S, and an image plane is denoted by I.

Moreover, although it is not shown in the diagrams, a filter and a parallel flat plate of a cover glass of an electronic image pickup element (such as a CCD (charge coupled device) and a C-MOS (complementary metal-oxide semiconductor) sensor) may be disposed. Moreover, a multilayer film for restricting a wavelength region may be formed on a surface of the cover glass. Moreover, a low-pass filter effect may be imparted to the cover glass on which, a wavelength region restricting coating which restricts infrared light is applied. An arrangement may be made such that the parallel flat plate does not have a function of a low-pass filter.

In each example, an image forming lens system includes in order from an object side to an image side, an object-side lens unit group GO, an aperture stop S, and an image-side lens unit group GI.

Moreover, each numerical data is data in a state of focused at an object at infinity. The unit of length for each numerical value is mm, and the unit of angle is ° (degree).

An image forming lens system according to the example 1, as shown in FIG. 1A, includes in order from an object side to an image side, an object-side lens unit group GO having a positive refractive power, an aperture stop S, and an image-side lens unit group GI having a negative refractive power. Here, r15 is the aperture stop, and r23 is a virtual surface.

The object-side lens unit group GO includes in order from the object side to the image side, a first lens unit G1 having a positive refractive power and a second lens unit G2 having a negative refractive power. The image-side lens unit group GI includes a third lens unit G3 having a negative refractive power, a fourth lens unit G4 having a positive refractive power, a fifth lens unit G5 having a negative refractive power, and a sixth lens unit G6 having a positive refractive power.

The first lens unit G1 includes a positive meniscus lens L1 having a convex surface directed toward the object side, a biconvex positive lens L2, a negative meniscus lens L3 having a convex surface directed toward the object side, a negative meniscus lens L4 having a convex surface directed toward the object side, and a biconvex positive lens L5. Here, the negative meniscus lens L4 and the biconvex positive lens L5 are cemented.

The second lens unit G2 includes a biconvex positive lens L6, a biconcave negative lens L7, and a biconcave negative lens L8. Here, the biconvex positive lens L6 and the biconcave negative lens L7 are cemented.

The third lens unit G3 includes a biconvex positive lens L9 and a biconcave negative lens L10. The third lens unit G3 is a focusing lens unit, and moves toward the image side along an optical axis at the time of focusing from an object at infinity to an object at a close distance.

The fourth lens unit G4 includes a negative meniscus lens L11 having a convex surface directed toward the object side and a biconvex positive lens L12. Here, the negative meniscus lens L11 and the biconvex positive lens L12 are cemented.

The fifth lens unit G5 includes a biconvex positive lens L13, a biconcave negative lens L14, and a biconcave negative lens L15. The fifth lens unit G5 is an image-motion correcting lens unit, and moves in a direction different from a direction of the optical axis, such as a direction orthogonal to the optical axis, at the time of correcting image motion.

The sixth lens unit G6 includes a biconvex positive lens 16 and a biconvex positive lens L17.

Figure 1B:
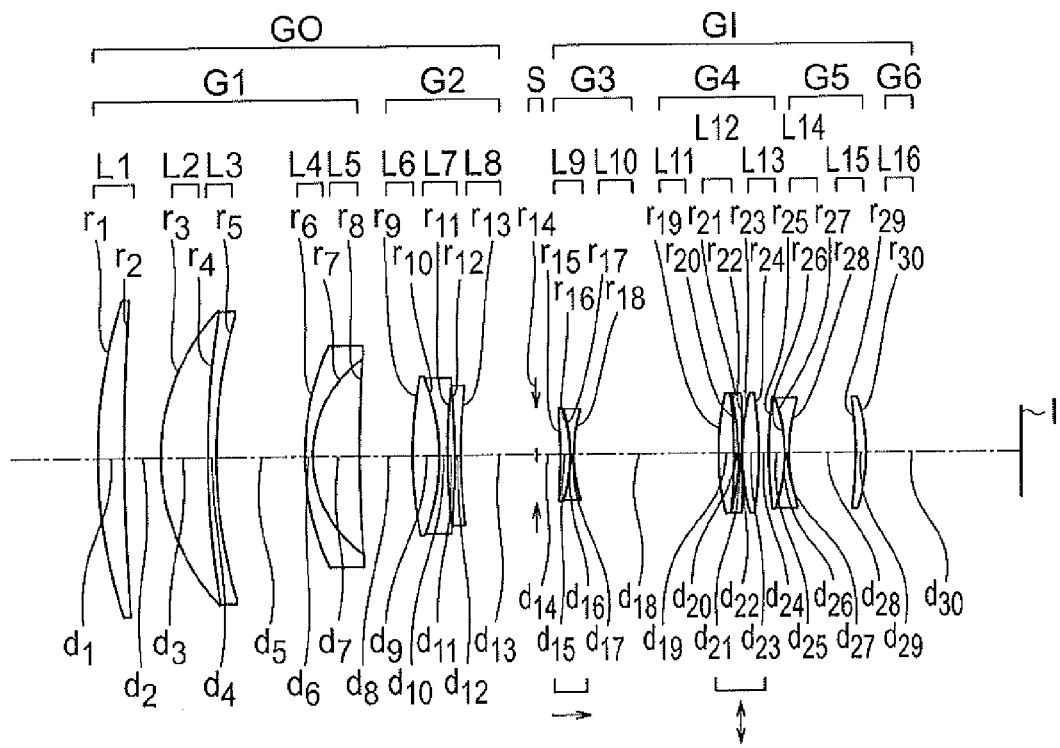

An image forming lens system according to the example 2, as shown in FIG. 1B, includes in order from an object side to an image side, an object-side lens unit group GO having a positive refractive power, an aperture stop S, and an image-side lens unit group GI having a positive refractive power. Here, r14 is the aperture stop, and there is not virtual surface.

The object-side lens unit group GO includes in order from the object side to the image side, a first lens unit G1 having a positive refractive power and a second lens unit G2 having a negative refractive power. The image-side lens unit group GI includes a third lens unit G3 having a negative refractive power, a fourth lens unit G4 having a positive refractive power, a fifth lens unit G5 having a negative refractive power, and a sixth lens unit G6 having a positive refractive power.

The first lens unit G1 includes a positive meniscus lens L1 having a convex surface directed toward the object side, a positive meniscus lens L2 having a convex surface directed toward the object side, a negative meniscus lens L3 having a convex surface directed toward the object side, a negative meniscus lens L4 having a convex surface directed toward the object side, and a positive meniscus lens L5 having a convex surface directed toward the object side. Here, the positive meniscus lens L2 and the negative meniscus lens L3 are cemented. Moreover, the negative meniscus lens L4 and the positive meniscus lens L5 are cemented.

The second lens unit G2 includes a biconvex positive lens L6, a biconcave negative lens L7, and a biconcave negative lens L8. Here, the biconvex positive lens L6 and the biconcave negative lens L7 are cemented.

The third lens unit G3 includes a positive meniscus lens L9 having a convex surface directed toward the image side and a biconcave negative lens L10. The third lens unit G3 is a focusing lens unit, and moves toward the image side along an optical axis at the time of focusing from an object at infinity to an object at a close distance.

The fourth lens unit G4 includes a biconvex positive lens L11, a negative meniscus lens L12 having a convex surface directed toward the image side, and a biconvex positive lens L13. The fourth lens unit G4 is an image-motion correcting lens unit, and moves in a direction different from a direction of the optical axis, such as a direction orthogonal to the optical axis, at the time of correcting image motion.

The fifth lens unit G5 includes a biconvex positive lens L14 and a biconcave negative lens L15.

The sixth lens unit G6 includes a positive meniscus lens L16 having a convex surface directed toward the image side.

Figure 2A:
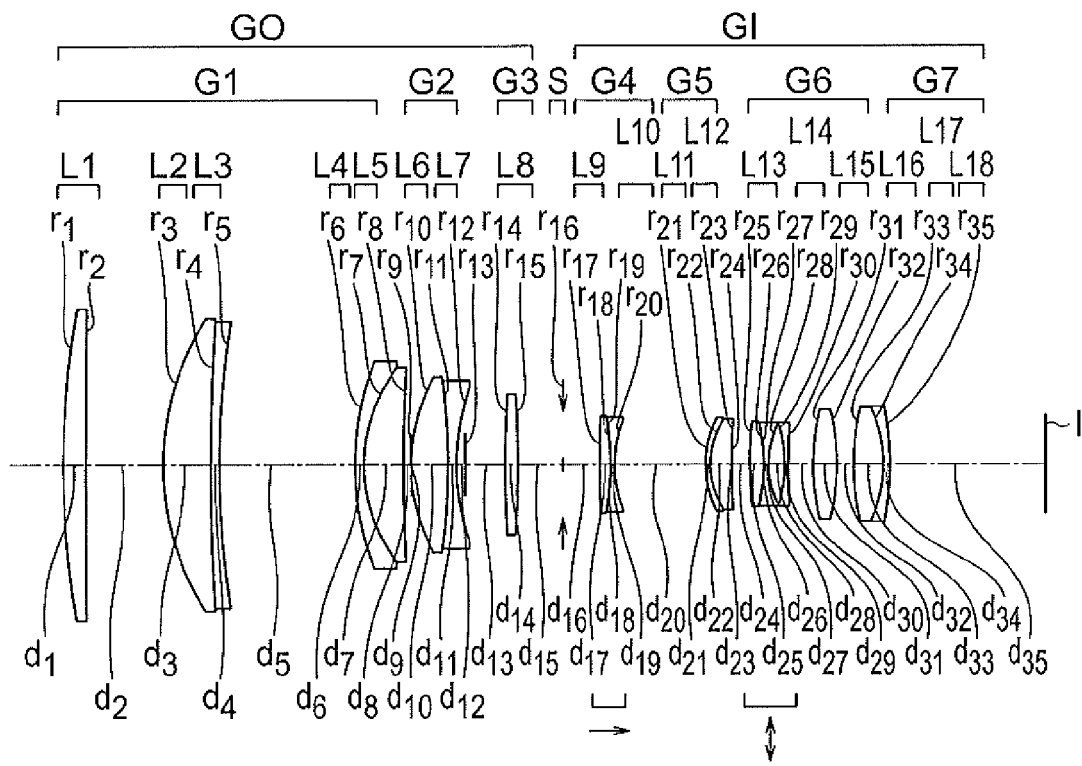
FIG. 2A and FIG. 2B are lens cross-sectional views at the time of focusing at an object at infinity of an image forming lens system according to the present invention, where.

An image forming lens system according to the example 3, as shown in FIG. 2A, includes in order from an object side to an image side, an object-side lens unit group GO having a positive refractive power, an aperture stop S, and an image-side lens unit group GI having a negative refractive power. Here, r16 is the aperture stop, and r9, r13, and r24 are virtual surfaces.

The object-side lens unit group GO includes in order from the object side to the image side, a first lens unit G1 having a positive refractive power and a second lens unit G2 having a negative refractive power. The image-side lens unit group GI includes a third lens unit G3 having a positive refractive power, a fourth lens unit G4 having a negative refractive power, a fifth lens unit G5 having a positive refractive power, a sixth lens unit G6 having a negative refractive power, and a seventh lens unit G7 having a positive refractive power.

The first lens unit G1 includes a positive meniscus lens L1 having a convex surface directed toward the object side, a positive meniscus lens L2 having a convex surface directed toward the object side, a negative meniscus lens L3 having a convex surface directed toward the object side, a negative meniscus lens L4 having a convex surface directed toward the object side, and a positive meniscus lens L5 having a convex surface directed toward the object side. Here, the positive meniscus lens L2 and the negative meniscus lens L3 are cemented. Moreover, the negative meniscus lens L4 and the positive meniscus lens L5 are cemented.

The second lens unit G2 includes a biconvex positive lens L6 and a biconcave negative lens L7. Here, the biconvex positive lens L6 and the biconcave negative lens L7 are cemented.

The third lens unit G3 includes a biconvex positive lens L8.

The fourth lens unit G4 includes a biconvex positive lens L9 and a biconcave negative lens L10. The fourth lens unit G4 is a focusing lens unit, and moves toward the image side along an optical axis at the time of focusing from an object at infinity to an object at a close distance.

The fifth lens unit G5 includes a negative meniscus lens L11 having a convex surface directed toward the object side and a positive meniscus lens L12 having a convex surface directed toward the object side. Here, the negative meniscus lens L11 and the positive meniscus lens L12 are cemented.

The sixth lens unit G6 includes a biconvex positive lens L13, a biconcave negative lens L14, and a biconvex positive lens L15. The sixth lens unit G6 is an image-motion correcting lens unit, and moves in a direction different from a direction of the optical axis, such as a direction orthogonal to the optical axis, at the time of correcting image motion.

The seventh lens unit G7 includes a biconvex positive lens L16, a biconvex positive lens L17, and a negative meniscus lens L18 having a convex surface directed toward the image side. Here, the biconvex positive lens L17 and the negative meniscus lens L18 are cemented.

Figure 2B:
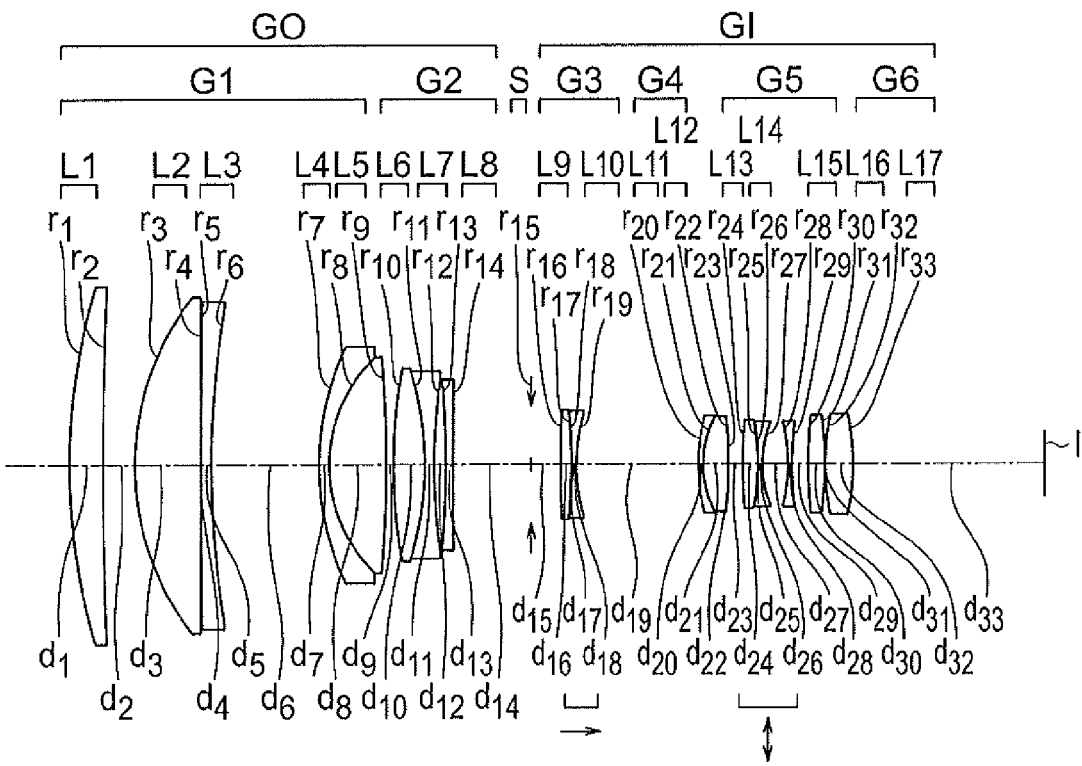

An image forming lens system according to the example 4, as shown in FIG. 2B, includes in order from an object side to an image side, an object-side lens unit group GO having a positive refractive power and an image-side lens unit group GI having a positive refractive power. Here, r15 is an aperture stop, and r23 is a virtual surface.

The object-side lens unit group GO includes in order from the object side to the image side, a first lens unit G1 having a positive refractive power and a second lens unit G2 having a negative refractive power. The image-side lens system group GI includes a third lens unit G3 having a negative refractive power, a fourth lens unit G4 having a positive refractive power, a fifth lens unit G5 having a negative refractive power, and a sixth lens unit G6 having a positive refractive power.

The first lens unit G1 includes a positive meniscus lens L1 having a convex surface directed toward the object side, a biconvex positive lens L2, a negative meniscus lens L3 having a convex surface directed toward the object side, a negative meniscus lens L4 having a convex surface directed toward the object side, and a biconvex positive lens L5. Here, the negative meniscus lens L4 and the biconvex positive lens L5 are cemented.

The second lens unit G2 includes a biconvex positive lens L6, a biconcave negative lens L7, and a biconcave negative lens L8. Here, the biconvex positive lens L6 and the biconcave negative lens L7 are cemented.

The third lens unit G3 includes a biconvex positive lens L9 and a biconcave negative lens L10. The third lens unit G3 is a focusing lens unit, and moves toward the image side along an optical axis at the time of focusing from an object at infinity to an object at a close distance.

The fourth lens unit G4 includes a negative meniscus lens L11 having a convex surface directed toward the object side and a biconvex positive lens L12. Here, the negative meniscus lens L11 and the biconvex positive lens L12 are cemented.

The fifth lens unit G5 includes a biconvex positive lens L13, a biconcave negative lens L14, and a biconcave negative lens L15. The fifth lens unit G5 is an image-motion correcting lens unit, and moves in a direction different from a direction of the optical axis, such as a direction orthogonal to the optical axis, at the time of correcting image motion.

The sixth lens unit G6 includes a biconvex positive lens L16 and a biconvex positive lens L17.

Figure 3A:
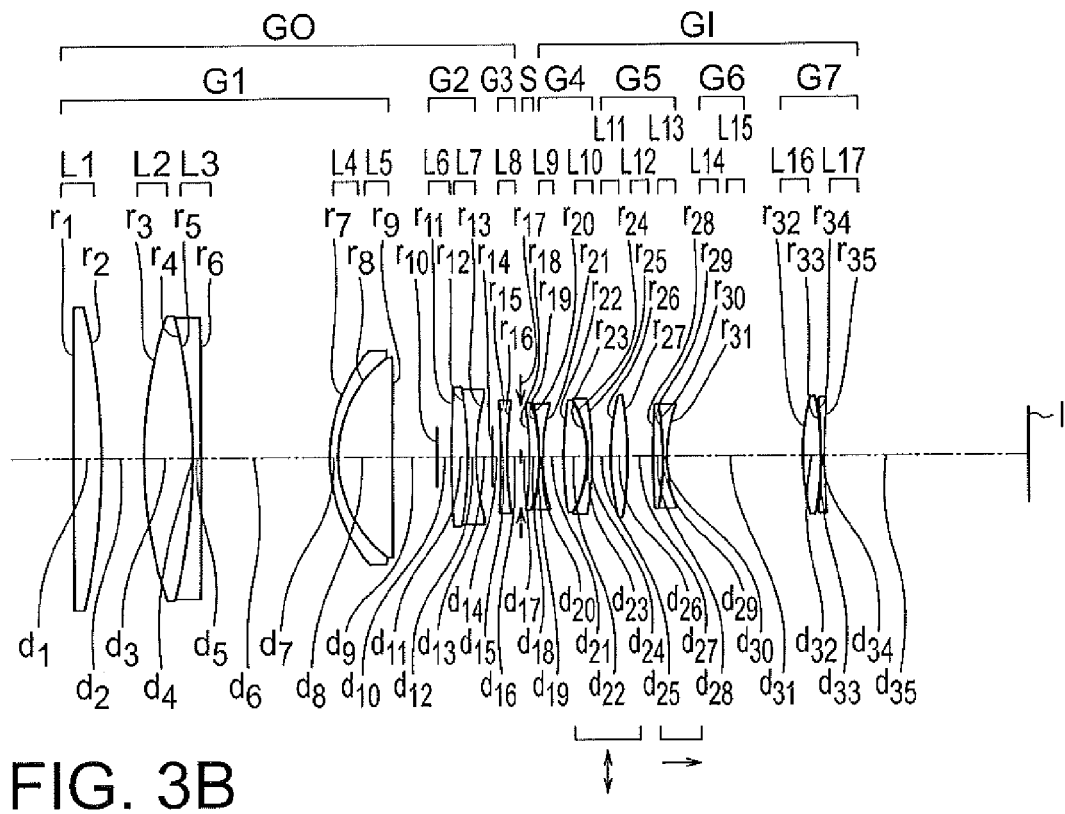
FIG. 3A and FIG. 3B are lens cross-sectional views at the time of focusing at an object at infinity of an image forming lens system according to the present invention, where.

An image forming lens system according to the example 5, as shown in FIG. 3A, includes in order from an object side to an image side, an object-side lens unit group GO having a positive refractive power, an aperture stop S, and an image-side lens unit group GI having a positive refractive power. Here, r17 is an aperture stop, and r10 and r14 are virtual surfaces.

The object-side lens unit group GO includes in order from the object side to the image side, a first lens unit G1 having a positive refractive power, a second lens unit G2 having a negative refractive power, and a third lens unit G3 having a negative refractive power. The image-side lens unit group GI includes a fourth lens unit G4 having a negative refractive power, a fifth lens unit G5 having a positive refractive power, a sixth lens unit G6 having a negative refractive power, and a seventh lens unit G7 having a positive refractive power.

The first lens unit G1 includes a biconvex positive lens L1, a biconvex positive lens L2, a negative meniscus lens L3 having a convex surface directed toward the image side, a negative meniscus lens L4 having a convex surface directed toward the object side, and a positive meniscus lens L5 having a convex surface directed toward the object side. Here, the negative meniscus lens L4 and the positive meniscus lens L5 are cemented.

The second lens unit G2 includes a biconvex positive lens L6 and a biconcave negative lens L7. Here, the biconvex positive lens L6 and the biconcave negative lens L7 are cemented.

The third lens unit G3 includes a biconcave negative lens L8.

The fourth lens unit G4 includes a positive meniscus lens L9 having a convex surface directed toward the object side and a biconcave negative lens L10.

The fifth lens unit G5 includes a biconvex positive lens L11, a negative meniscus lens L12 having a convex surface directed toward the image side, and a biconvex positive lens L13. The fifth lens unit G5 is an image-motion correcting lens unit, and moves in a direction different from a direction of an optical axis, such as a direction orthogonal to the optical axis, at the time of correcting image motion.

The sixth lens unit G6 includes a biconvex positive lens L14 and a biconcave negative lens L15. The sixth lens unit G6 is a focusing lens unit, and moves toward the image side along the optical axis at the time of focusing from an object at infinity to an object at a close distance.

The seventh lens unit G7 includes a biconvex positive lens L16 and a biconcave negative lens L17.

Figure 3B:
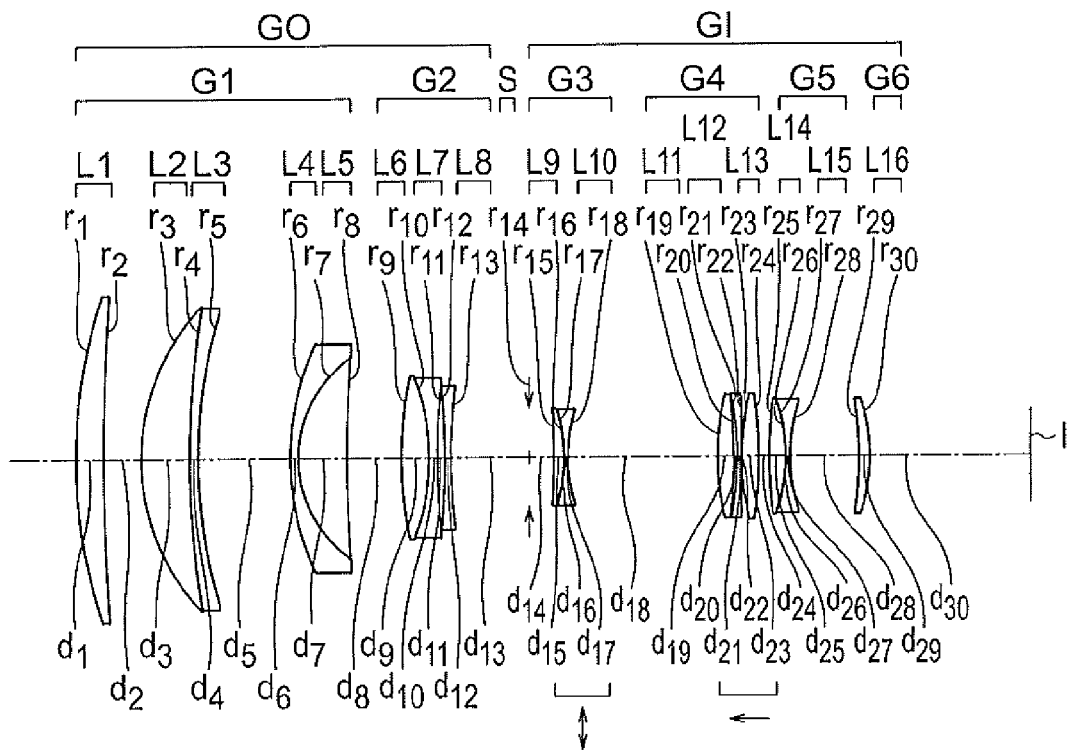

An image forming lens system according to the example 6, as shown in FIG. 3B, includes in order from an object side to an image side, an object-side lens unit group GO having a positive refractive power, an aperture stop S, and an image-side lens unit group GI having a positive refractive power. Here, r14 is the aperture stop.

The object-side lens unit group GO includes in order from the object side to the image side, a first lens unit G1 having a positive refractive power and a second lens unit G2 having a negative refractive power. The image-side lens unit group GI includes a third lens unit G3 having a negative refractive power, a fourth lens unit G4 having a positive refractive power, a fifth lens unit G5 having a negative refractive power, and a sixth lens unit G6 having a positive refractive power.

The first lens unit G1 includes a positive meniscus lens L1 having a convex surface directed toward the object side, a positive meniscus lens L2 having a convex surface directed toward the object side, a negative meniscus lens L3 having a convex surface directed toward the object side, a negative meniscus lens L4 having a convex surface directed toward the object side, and a positive meniscus lens L5 having a convex surface directed toward the object side. Here, the positive meniscus lens L2 and the negative meniscus lens L3 are cemented. Moreover, the negative meniscus lens L4 and the positive meniscus lens L5 are cemented.

The second lens unit G2 includes a biconvex positive lens L6, a biconcave negative lens L7, and a biconcave negative lens L8. Here, the biconvex positive lens L6 and the biconcave negative lens L7 are cemented.

The third lens unit G3 includes a positive meniscus lens L9 having a convex surface directed toward the image side and a biconcave negative lens L10. The third lens unit G3 is an image-motion correcting lens unit, and moves in a direction different from a direction of an optical axis, such as a direction orthogonal to the optical axis, at the time of correcting image motion.

The fourth lens unit G4 includes a biconvex positive lens L11, a negative meniscus lens L12 having a convex surface directed toward the image side, and a biconvex positive lens L13. The fourth lens unit G4 is a focusing lens unit, and moves toward the object side along the optical axis, at the time of focusing from an object at infinity to an object at a close distance.

The fifth lens unit G5 includes a biconvex positive lens L14 and a biconvex positive lens L15.

The sixth lens unit G6 includes a positive meniscus lens L16 having a convex surface directed toward the image side.

Figure 4A:
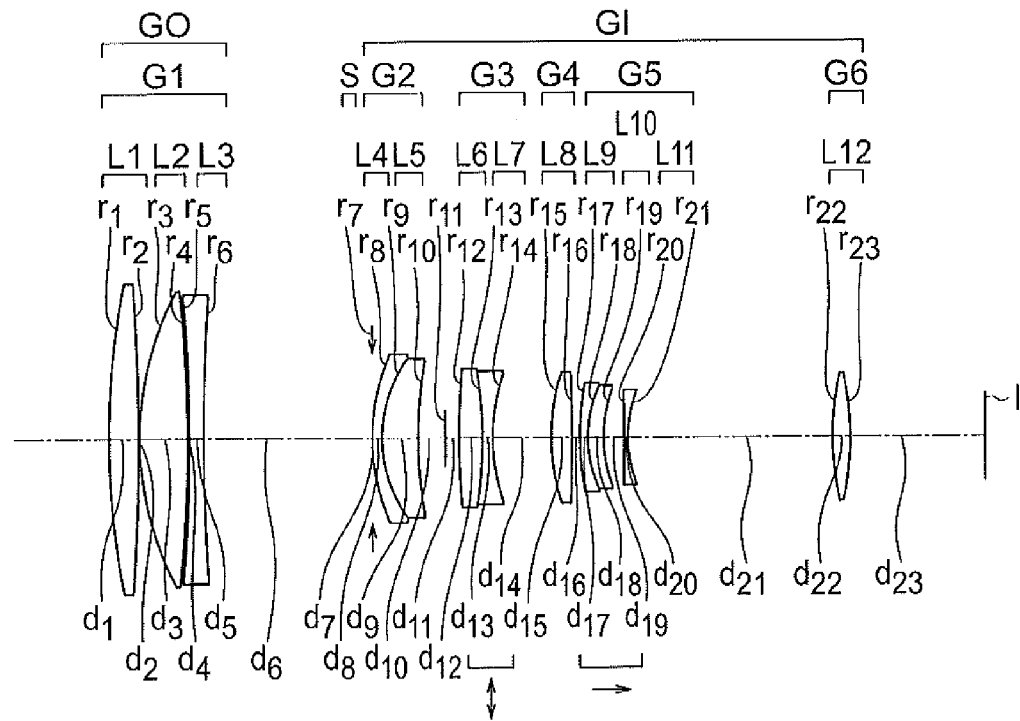
FIG. 4A and FIG. 4B are lens cross-sectional views at the time of focusing at an object at infinity of an image forming lens system according to the present invention, where.

An image forming lens system according to the example 7, as shown in FIG. 4A, includes in order from an object side to an image side, an object-side lens unit group GO having a positive refractive power, an aperture stop S, and an image-side lens unit group GI having a positive refractive power. Here, r7 is the aperture stop, and r11 is a virtual surface.

The object-side lens unit group GO includes in order from the object side to the image side, a first lens unit G1 having a positive refractive power. The image-side lens unit group GI includes a second lens unit G2 having a positive refractive power, a third lens unit G3 having a negative refractive power, a fourth lens unit G4 having a positive refractive power, a fifth lens unit G5 having a negative refractive power, and a sixth lens unit G6 having a positive refractive power.

The first lens unit G1 includes a biconvex positive lens L1, a biconvex positive lens L2, and a biconcave negative lens L3.

The second lens unit G2 includes a negative meniscus lens L4 having a convex surface directed toward the object side and a positive meniscus lens L5 having a convex surface directed toward the object side. Here, the negative meniscus lens L4 and the positive meniscus lens L5 are cemented.

The third lens unit G3 includes a biconvex positive lens L6 and a biconcave negative lens L7. Here, the biconvex positive lens L6 and the biconcave negative lens L7 are cemented.

The fourth lens unit G4 includes a biconvex positive lens L8.

The fifth lens unit G5 includes a negative meniscus lens L9 having a convex surface directed toward the object side, a positive meniscus lens L10 having a convex surface directed toward the object side, and a biconcave negative lens L11. Here, the negative meniscus lens L9 and the positive meniscus lens L10 are cemented. The fifth lens unit G5 is a focusing lens unit, and moves toward the image side along the optical axis, at the time of focusing from an object at infinity to an object at a close distance.

The sixth lens unit G6 includes a biconvex positive lens L12.

Figure 4B:
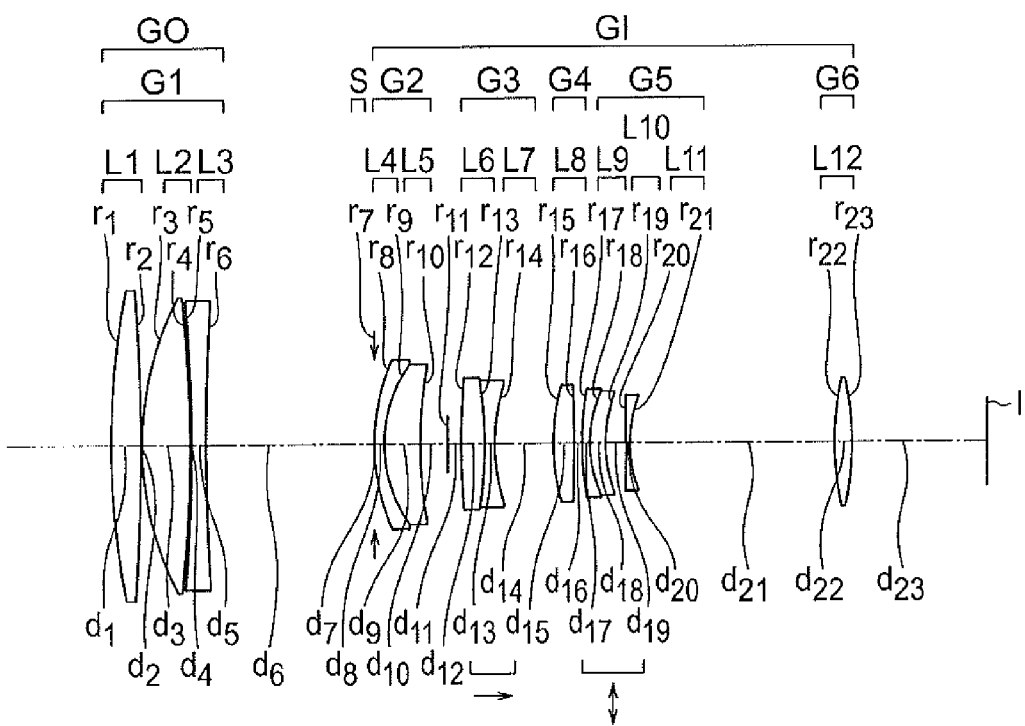

An image forming lens system according to the example 8, as shown in FIG. 4B, includes in order from an object side to an image side, an object-side lens unit group GO having a positive refractive power, an aperture stop S, and an image-side lens unit group GI having a positive refractive power. Here, r7 is the aperture stop, and r11 is a virtual surface.

The object-side lens unit group GO includes in order from the object side to the image side, a first lens unit G1 having a positive refractive power. The image-side lens unit group GI includes a second lens unit G2 having a positive refractive power, a third lens unit G3 having a negative refractive power, a fourth lens unit G4 having a positive refractive power, a fifth lens unit G5 having a negative refractive power, and a sixth lens unit G6 having a positive refractive power.

The first lens unit G1 includes a biconvex positive lens L1, a biconvex positive lens L2, and a biconcave negative lens L3.

The second lens unit G2 includes a negative meniscus lens L4 having a convex surface directed toward the object side and a positive meniscus lens L5 having a convex surface directed toward the object side. Here, the negative meniscus lens L4 and the positive meniscus lens L5 are cemented.

The third lens unit G3 includes a biconvex positive lens L6 and a biconcave negative lens L7. Here, the biconvex positive lens L6 and the biconcave negative lens L7 are cemented. The third lens unit G3 is a focusing lens unit, and moves toward the image side along an optical axis, at the time of focusing from an object at infinity to an object at a close distance.

The fourth lens unit G4 includes a biconvex positive lens L8.

The fifth lens unit G5 includes a negative meniscus lens L9 having a convex surface directed toward the object side, a positive meniscus lens L10 having a convex surface directed toward the object side, and a biconcave negative lens L11. Here, the negative meniscus lens L9 and the positive meniscus lens L10 are cemented. The fifth lens unit G5 is an image-motion correcting lens unit, and moves in a direction different from a direction of the optical axis, such as a direction orthogonal to the optical axis, at the time of correcting image motion.

The sixth lens unit G6 includes a biconvex positive lens L12.

Numerical data of each example is shown below. Apart from the aforementioned symbols, r denotes a radius of curvature of a lens surface, d denotes a distance between lens surfaces, nd denotes a refractive index for a d-line of each lens, and νd denotes Abbe number for each lens. Moreover f denotes a focal length of the overall image forming lens system, FNO. denotes an F-number, ω denotes a half angle of view, IH denotes an image height, FB denotes a back focus, and Lens total length is a distance from a lens surface nearest to the object of the image forming lens system up to a lens surface nearest to the image of the image forming lens system. FB (back focus) is a value which is a distance from the last lens surface up to a paraxial image plane expressed upon air conversion. Moreover, the unit of length for each numerical value is mm, and the unit of angle is ° (degree).

Moreover, Infinity indicates the time of focusing at an object at infinity and Close distance indicates the time of focusing at an object at a close distance. Here, values in a column of close distance are values in a state of being focused at an object at a closest distance. A practical distance between an object and an image in the state of being focused at an object at a closest distance is 1.4 m in the examples 1, 2, 3, 4, 5, and 7, 3 m in the example 6, and 2 m in the example 8.

Example 1

Unit mm

Surface data

| Surface no. | r | d | nd | vd |
|---|---|---|---|---|
| 1 | 132.985 | 6.746 | 1.48749 | 70.23 |
| 2 | 833.805 | 6.500 | | |
| 3 | 56.824 | 13.500 | 1.49700 | 81.54 |
| 4 | −18692.587 | 0.100 | | |
| 5 | 2292.831 | 2.000 | 1.83481 | 42.71 |
| 6 | 194.055 | 22.000 | | |
| 7 | 58.436 | 2.000 | 1.79952 | 42.22 |
| 8 | 31.339 | 11.474 | 1.43875 | 94.93 |
| 9 | −283.074 | 1.600 | | |
| 10 | 114.275 | 6.289 | 1.75520 | 27.51 |
| 11 | −67.671 | 2.000 | 1.91082 | 35.25 |
| 12 | 130.501 | 2.322 | | |
| 13 | −202.441 | 1.500 | 1.78590 | 44.20 |
| 14 | 1233.704 | 16.000 | | |
| 15 (Stop) | ∞ | Variable | | |
| 16 | 282.863 | 2.200 | 1.84666 | 23.78 |
| 17 | −124.870 | 0.100 | | |
| 18 | −110.471 | 0.900 | 1.80139 | 45.45 |
| 19 | 38.312 | Variable | | |
| 20 | 39.801 | 1.000 | 1.92286 | 18.90 |
| 21 | 22.065 | 4.963 | 1.58267 | 46.42 |
| 22 | −136.632 | 0.100 | | |
| 23 | ∞ | 3.000 | | |
| 24 | 112.013 | 3.000 | 1.84666 | 23.78 |
| 25 | −47.684 | 0.100 | | |
| 26 | −51.871 | 0.900 | 1.80400 | 46.57 |
| 27 | 24.988 | 5.044 | | |
| 28 | −37.965 | 0.800 | 1.69680 | 55.53 |
| 29 | 77.357 | 3.300 | | |
| 30 | 95.000 | 3.393 | 1.72342 | 37.95 |
| 31 | −82.082 | 0.100 | | |
| 32 | 55.512 | 5.500 | 1.51633 | 64.14 |
| 33 | −51.010 | | | |
| Image plane | ∞ | | | |

Various data

| | Infinity | Close distance |
|---|---|---|
| f | 293.568 | 211.066 |
| FNO. | 4.059 | 2.907 |
| 2ω (Angle of view) | 4.3 | |
| IH | 11.15 | 11.15 |
| FB | 39.180 | 39.180 |
| Lens total length | 198.678 | 198.678 |
| d15 | 6.000 | 24.855 |
| d19 | 25.067 | 6.212 |

Example 2

Unit mm

Surface data

| Surface no. | r | d | nd | vd |
|---|---|---|---|---|
| 1 | 129.053 | 6.500 | 1.48749 | 70.23 |
| 2 | 524.363 | 9.000 | | |
| 3 | 54.665 | 11.500 | 1.49700 | 81.54 |
| 4 | 227.526 | 2.000 | 1.83481 | 42.71 |
| 5 | 127.067 | 22.000 | | |
| 6 | 65.938 | 2.000 | 1.80100 | 34.97 |
| 7 | 30.235 | 11.510 | 1.49700 | 81.54 |
| 8 | 333.862 | 13.109 | | |
| 9 | 101.957 | 6.630 | 1.84666 | 23.78 |
| 10 | −55.370 | 2.000 | 1.80100 | 34.97 |
| 11 | 150.959 | 1.850 | | |
| 12 | −226.650 | 1.500 | 1.80000 | 29.84 |
| 13 | 137.511 | 18.804 | | |
| 14 (Stop) | ∞ | Variable | | |
| 15 | −172.777 | 2.409 | 1.84666 | 23.78 |
| 16 | −40.436 | 0.100 | | |
| 17 | −42.309 | 0.900 | 1.77250 | 49.60 |
| 18 | 40.347 | Variable | | |
| 19 | 68.843 | 3.787 | 1.88300 | 40.76 |
| 20 | −129.270 | 0.954 | | |
| 21 | −70.637 | 1.000 | 1.92286 | 18.90 |
| 22 | −1887.125 | 0.100 | | |
| 23 | 65.708 | 4.000 | 1.60311 | 60.64 |
| 24 | −108.573 | 2.500 | | |
| 25 | 123.098 | 3.866 | 1.71736 | 29.52 |
| 26 | −41.995 | 0.100 | | |
| 27 | −41.898 | 1.000 | 1.88300 | 40.76 |
| 28 | 43.554 | 16.332 | | |
| 29 | −94.313 | 2.610 | 1.60342 | 38.03 |
| 30 | −44.999 | | | |
| Image plane | ∞ | | | |

Various data

| | Infinity | Close distance |
|---|---|---|
| f | 293.991 | 214.486 |
| FNO. | 3.794 | 2.747 |
| 2ω (Angle of view) | 4.3 | |
| IH | 11.15 | 11.15 |
| FB | 38.733 | 38.733 |
| Lens total length | 228.578 | 228.578 |
| d14 | 6.000 | 33.785 |
| d18 | 35.785 | 8.000 |

Example 3

Unit mm

Surface data

| Surface no. | r | d | nd | vd |
|---|---|---|---|---|
| 1 | 211.537 | 5.200 | 1.48749 | 70.23 |
| 2 | 2910.618 | 18.098 | | |
| 3 | 65.000 | 11.000 | 1.48749 | 70.23 |
| 4 | 588.917 | 2.000 | 1.77250 | 49.60 |
| 5 | 212.141 | 31.500 | | |
| 6 | 69.815 | 2.000 | 1.80440 | 39.59 |
| 7 | 37.924 | 9.200 | 1.43875 | 94.93 |
| 8 | 434.246 | 1.711 | | |
| 9 | ∞ | 0.100 | | |
| 10 | 43.603 | 8.500 | 1.43875 | 94.93 |
| 11 | −161.049 | 2.000 | 1.77250 | 49.60 |
| 12 | 55.257 | 2.000 | | |
| 13 | ∞ | 9.352 | | |
| 14 | 307.448 | 3.000 | 1.80810 | 22.76 |
| 15 | −274.895 | 10.557 | | |
| 16 (Stop) | ∞ | Variable | | |
| 17 | 280.313 | 2.600 | 1.83400 | 37.16 |
| 18 | −65.868 | 0.100 | | |
| 19 | −65.868 | 0.900 | 1.75500 | 52.32 |
| 20 | 30.383 | Variable | | |
| 21 | 26.080 | 1.000 | 1.84666 | 23.78 |
| 22 | 19.668 | 4.900 | 1.53996 | 59.46 |
| 23 | 168.839 | 0.100 | | |
| 24 | ∞ | 4.218 | | |
| 25 | 97.746 | 3.300 | 1.84666 | 23.78 |
| 26 | −40.187 | 0.100 | | |

-continued

| Unit mm | | | | |
|---|---|---|---|---|
| 27 | −40.187 | 0.900 | 1.77250 | 49.60 |
| 28 | 22.475 | 3.722 | | |
| 29 | −33.295 | 0.800 | 1.72916 | 54.68 |
| 30 | 241.876 | 5.718 | | |
| 31 | 52.470 | 5.500 | 1.63980 | 34.46 |
| 32 | −54.148 | 3.779 | | |
| 33 | 57.978 | 7.000 | 1.53172 | 48.84 |
| 34 | −31.015 | 1.500 | 1.92286 | 18.90 |
| 35 | −71.450 | | | |
| Image plane | ∞ | | | |

| Various data | | |
|---|---|---|
| | Infinity | Close distance |
| f | 294.032 | 229.457 |
| FNO. | 4.086 | 3.160 |
| 2ω (Angle of view) | 4.4 | |
| IH | 11.45 | 11.45 |
| FB | 36.300 | 36.300 |
| Lens total length | 228.469 | 228.469 |
| d16 | 8.545 | 26.113 |
| d20 | 21.268 | 3.700 |

Example 4

| Unit mm | | | | |
|---|---|---|---|---|
| Surface data | | | | |
| Surface no. | r | d | nd | vd |
| 1 | 226.165 | 11.472 | 1.48749 | 70.23 |
| 2 | 1418.036 | 11.054 | | |
| 3 | 96.639 | 22.959 | 1.49700 | 81.54 |
| 4 | −31790.114 | 0.170 | | |
| 5 | 3899.372 | 3.401 | 1.83481 | 42.71 |
| 6 | 330.026 | 37.415 | | |
| 7 | 99.381 | 3.401 | 1.79952 | 42.22 |
| 8 | 53.297 | 19.514 | 1.43875 | 94.93 |
| 9 | −481.418 | 2.721 | | |
| 10 | 194.345 | 10.696 | 1.75520 | 27.51 |
| 11 | −115.087 | 3.402 | 1.91082 | 35.25 |
| 12 | 221.940 | 3.949 | | |
| 13 | −344.287 | 2.551 | 1.78590 | 44.20 |
| 14 | 2098.137 | 27.211 | | |
| 15 (Stop) | ∞ | Variable | | |
| 16 | 481.059 | 3.741 | 1.84666 | 23.78 |
| 17 | −212.365 | 0.170 | | |
| 18 | −187.876 | 1.531 | 1.80139 | 45.45 |
| 19 | 65.157 | Variable | | |
| 20 | 67.689 | 1.701 | 1.92286 | 18.90 |
| 21 | 37.526 | 8.440 | 1.58267 | 46.42 |
| 22 | −232.367 | 0.170 | | |
| 23 | ∞ | 5.102 | | |
| 24 | 190.499 | 5.102 | 1.84666 | 23.78 |
| 25 | −81.096 | 0.170 | | |
| 26 | −88.216 | 1.531 | 1.80400 | 46.57 |
| 27 | 42.496 | 8.578 | | |
| 28 | −64.567 | 1.361 | 1.69680 | 55.53 |
| 29 | 131.560 | 5.612 | | |
| 30 | 161.565 | 5.770 | 1.72342 | 37.95 |
| 31 | −139.595 | 0.170 | | |
| 32 | 94.408 | 9.354 | 1.51633 | 64.14 |
| 33 | −86.751 | | | |
| Image plane | ∞ | | | |

| Various data | | |
|---|---|---|
| | Infinity | Close distance |
| f | 499.265 | 325.022 |
| FNO. | 4.059 | 2.630 |

-continued

| Unit mm | | |
|---|---|---|
| 2ω (Angle of view) | 2.6 | |
| IH | 11.15 | 11.15 |
| FB | 66.633 | 66.633 |
| Lens total length | 337.887 | 337.887 |
| d15 | 10.204 | 51.386 |
| d19 | 42.631 | 1.449 |

Example 5

| Unit mm | | | | |
|---|---|---|---|---|
| Surface data | | | | |
| Surface no. | r | d | nd | vd |
| 1 | 5625.628 | 6.500 | 1.48749 | 70.23 |
| 2 | −170.513 | 10.239 | | |
| 3 | 112.896 | 11.500 | 1.49700 | 81.54 |
| 4 | −142.063 | 0.000 | | |
| 5 | −142.063 | 2.000 | 1.83481 | 42.71 |
| 6 | −4106.011 | 30.703 | | |
| 7 | 39.797 | 2.000 | 1.80000 | 29.84 |
| 8 | 30.739 | 13.000 | 1.43875 | 94.93 |
| 9 | 3647.532 | 10.762 | | |
| 10 | ∞ | 3.500 | | |
| 11 | 223.808 | 4.035 | 1.84666 | 23.78 |
| 12 | −90.924 | 2.000 | 1.74100 | 52.64 |
| 13 | 54.535 | 4.000 | | |
| 14 | ∞ | 2.000 | | |
| 15 | −207.922 | 1.500 | 1.77250 | 49.60 |
| 16 | 93.506 | 3.260 | | |
| 17 (Stop) | ∞ | 2.000 | | |
| 18 | −89.208 | 2.272 | 1.84666 | 23.78 |
| 19 | −44.367 | 0.100 | | |
| 20 | −60.388 | 0.900 | 1.60300 | 65.44 |
| 21 | 45.487 | 5.000 | | |
| 22 | 95.019 | 5.514 | 1.59551 | 39.24 |
| 23 | −28.041 | 0.271 | | |
| 24 | −27.918 | 1.000 | 1.84666 | 23.78 |
| 25 | −78.889 | 4.503 | | |
| 26 | 64.045 | 4.000 | 1.49700 | 81.54 |
| 27 | −94.092 | Variable | | |
| 28 | 200.994 | 2.300 | 1.84666 | 23.78 |
| 29 | −82.706 | 0.100 | | |
| 30 | −82.956 | 0.900 | 1.77250 | 49.60 |
| 31 | 34.659 | Variable | | |
| 32 | 61.636 | 4.276 | 1.58267 | 46.42 |
| 33 | −76.839 | 0.100 | | |
| 34 | −157.236 | 0.800 | 1.84666 | 23.78 |
| 35 | 187.822 | | | |
| Image plane | ∞ | | | |

| Various data | | |
|---|---|---|
| | Infinity | Close distance |
| f | 294.001 | 184.596 |
| FNO. | 4.133 | 2.580 |
| 2ω (Angle of view) | 4.3 | |
| IH | 11.45 | 11.45 |
| FB | 48.975 | 48.975 |
| Lens total length | 228.593 | 228.593 |
| d27 | 6.000 | 33.538 |
| d31 | 32.582 | 5.044 |

Example 6

Unit mm

Surface data

| Surface no. | r | d | nd | vd |
|---|---|---|---|---|
| 1 | 129.053 | 6.500 | 1.48749 | 70.23 |
| 2 | 524.363 | 9.000 | | |
| 3 | 54.665 | 11.500 | 1.49700 | 81.54 |
| 4 | 227.526 | 2.000 | 1.83481 | 42.71 |
| 5 | 127.067 | 22.000 | | |
| 6 | 65.938 | 2.000 | 1.80100 | 34.97 |
| 7 | 30.235 | 11.510 | 1.49700 | 81.54 |
| 8 | 333.862 | 13.109 | | |
| 9 | 101.957 | 6.630 | 1.84666 | 23.78 |
| 10 | −55.370 | 2.000 | 1.80100 | 34.97 |
| 11 | 150.959 | 1.850 | | |
| 12 | −226.650 | 1.500 | 1.80000 | 29.84 |
| 13 | 137.511 | 18.804 | | |
| 14 (Stop) | ∞ | 6.000 | | |
| 15 | −172.777 | 2.409 | 1.84666 | 23.78 |
| 16 | −40.436 | 0.100 | | |
| 17 | −42.309 | 0.900 | 1.77250 | 49.60 |
| 18 | 40.347 | Variable | | |
| 19 | 68.843 | 3.787 | 1.88300 | 40.76 |
| 20 | −129.270 | 0.954 | | |
| 21 | −70.637 | 1.000 | 1.92286 | 18.90 |
| 22 | −1887.125 | 0.100 | | |
| 23 | 65.708 | 4.000 | 1.60311 | 60.64 |
| 24 | −108.573 | Variable | | |
| 25 | 123.098 | 3.866 | 1.71736 | 29.52 |
| 26 | −41.995 | 0.100 | | |
| 27 | −41.898 | 1.000 | 1.88300 | 40.76 |
| 28 | 43.554 | 16.332 | | |
| 29 | −94.313 | 2.610 | 1.60342 | 38.03 |
| 30 | −44.999 | | | |
| Image plane | ∞ | | | |

Various data

| | Infinity | Close distance |
|---|---|---|
| f | 293.991 | 249.891 |
| FNO. | 3.794 | 3.213 |
| 2ω (Angle of view) | 4.3 | |
| IH | 11.15 | 11.15 |
| FB | 38.733 | 38.733 |
| Lens total length | 228.578 | 228.578 |
| d18 | 35.785 | 25.223 |
| d24 | 2.500 | 13.062 |

Example 7

Unit mm

Surface data

| Surface no. | r | d | nd | vd |
|---|---|---|---|---|
| 1 | 210.940 | 7.500 | 1.49700 | 81.54 |
| 2 | −594.912 | 0.300 | | |
| 3 | 84.134 | 12.000 | 1.49700 | 81.54 |
| 4 | −376.138 | 0.500 | | |
| 5 | −435.916 | 3.500 | 1.88300 | 40.76 |
| 6 | 571.205 | 43.110 | | |
| 7 (Stop) | ∞ | 0.000 | | |
| 8 | 54.718 | 2.500 | 1.84020 | 33.38 |
| 9 | 35.511 | 9.240 | 1.49700 | 81.54 |
| 10 | 113.892 | 7.000 | | |
| 11 | ∞ | 3.500 | | |
| 12 | 204.348 | 5.980 | 1.80810 | 22.76 |
| 13 | −112.102 | 2.570 | 1.88300 | 40.76 |
| 14 | 50.433 | 15.000 | | |
| 15 | 55.276 | 5.390 | 1.49700 | 81.54 |
| 16 | −447.250 | Variable | | |
| 17 | 80.000 | 2.000 | 1.54711 | 53.00 |
| 18 | 32.225 | 4.000 | 1.85818 | 27.52 |
| 19 | 36.616 | 5.209 | | |
| 20 | −570.008 | 1.000 | 1.49700 | 81.55 |
| 21 | 34.412 | Variable | | |
| 22 | 77.042 | 4.500 | 1.49700 | 81.55 |
| 23 | −77.403 | | | |
| Image plane | ∞ | | | |

Various data

| | Infinity | Close distance |
|---|---|---|
| f | 293.998 | 295.666 |
| FNO. | 4.058 | 4.078 |
| 2ω (Angle of view) | 4.3 | |
| IH | 11.15 | 11.15 |
| FB | 34.733 | 34.733 |
| Lens total length | 223.578 | 223.578 |
| d16 | 2.000 | 9.109 |
| d21 | 52.046 | 44.937 |

Example 8

Unit mm

Surface data

| Surface no. | r | d | nd | vd |
|---|---|---|---|---|
| 1 | 210.940 | 7.500 | 1.49700 | 81.54 |
| 2 | −594.912 | 0.300 | | |
| 3 | 84.134 | 12.000 | 1.49700 | 81.54 |
| 4 | −376.138 | 0.500 | | |
| 5 | −435.916 | 3.500 | 1.88300 | 40.76 |
| 6 | 571.205 | 43.110 | | |
| 7 (Stop) | ∞ | 0.000 | | |
| 8 | 54.718 | 2.500 | 1.84020 | 33.38 |
| 9 | 35.511 | 9.240 | 1.49700 | 81.54 |
| 10 | 113.892 | 7.000 | | |
| 11 | ∞ | Variable | | |
| 12 | 204.348 | 5.980 | 1.80810 | 22.76 |
| 13 | −112.102 | 2.570 | 1.88300 | 40.76 |
| 14 | 50.433 | Variable | | |
| 15 | 55.276 | 5.390 | 1.49700 | 81.54 |
| 16 | −447.250 | 2.000 | | |
| 17 | 80.000 | 2.000 | 1.54711 | 53.00 |
| 18 | 32.225 | 4.000 | 1.85818 | 27.52 |
| 19 | 36.616 | 5.209 | | |
| 20 | −570.008 | 1.000 | 1.49700 | 81.55 |
| 21 | 34.412 | 52.046 | | |
| 22 | 77.042 | 4.500 | 1.49700 | 81.55 |
| 23 | −77.403 | | | |
| Image plane | ∞ | | | |

Various data

| | Infinity | Close distance |
|---|---|---|
| f | 293.998 | 311.728 |
| FNO. | 4.058 | 4.296 |
| 2ω (Angle of view) | 4.3 | |
| IH | 11.15 | 11.15 |
| FB | 34.733 | 34.733 |
| Lens total length | 223.578 | 223.578 |
| d11 | 3.500 | 13.720 |
| d14 | 15.000 | 4.780 |

Figures 5A, 5B, 5C, 5D:
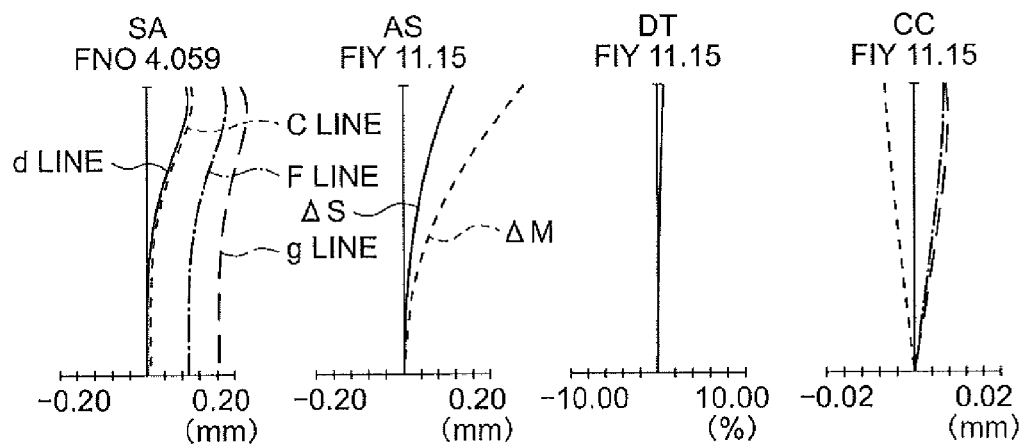
FIG. 5A, FIG. 5B, FIG. 5C, and FIG. 5D are aberration diagrams at the time of focusing at an object at infinity of the image forming lens system according to the example 1.
Figures 5E, 5F, 5G, 5H:
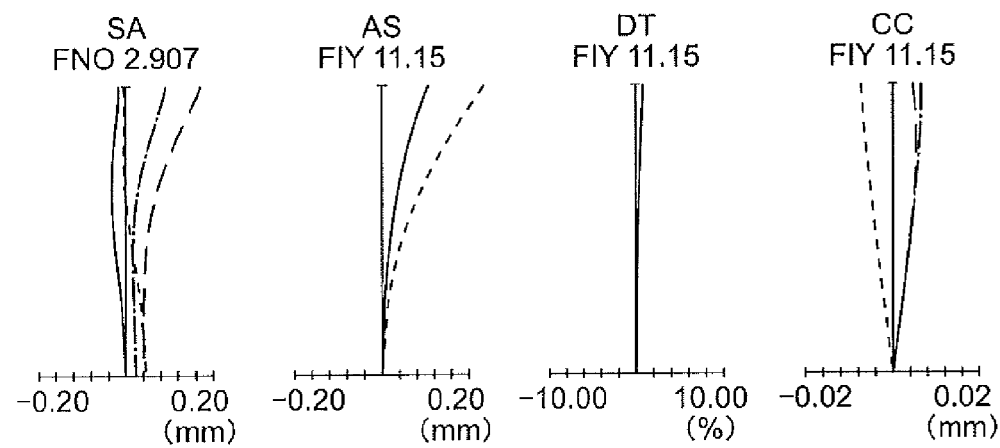
FIG. 5E, FIG. 5F, FIG. 5G, and FIG. 5H are aberration diagrams at the time of focusing at an object at a close distance of the image forming lens system according to the example 1.
Figures 7A, 7B, 7C, 7D:
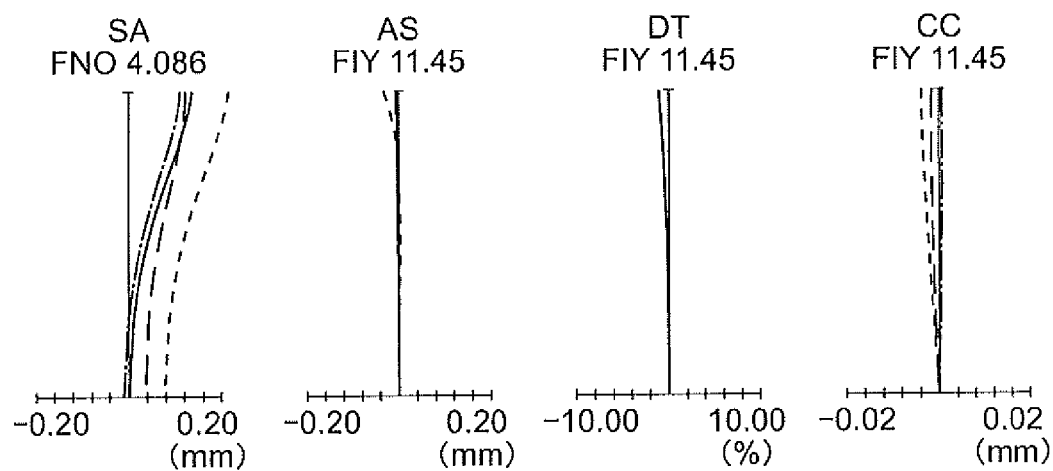
FIG. 7A, FIG. 7B, FIG. 7C, and FIG. 7D are aberration diagrams at the time of focusing at an object at infinity of the image forming lens system according to the example 3.
Figures 7E, 7F, 7G, 7H:
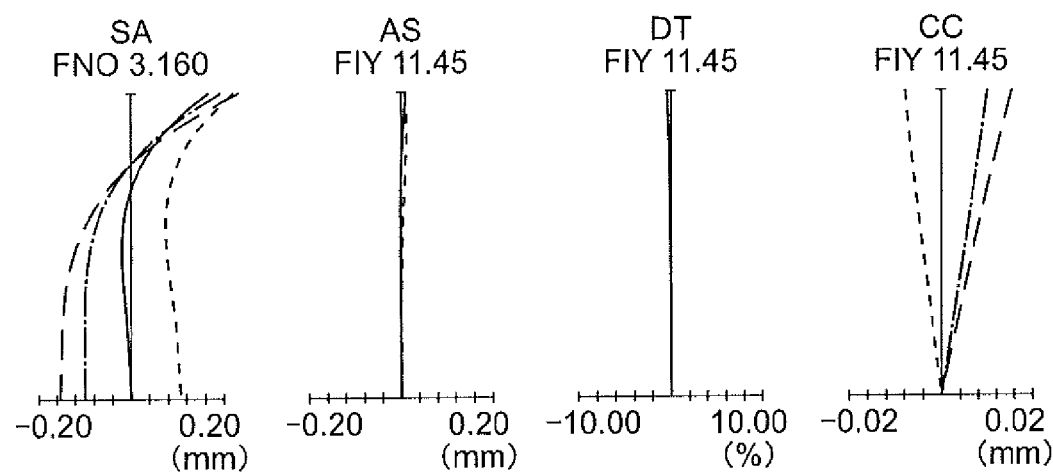
FIG. 7E, FIG. 7F, FIG. 7G, and FIG. 7H are aberration diagrams at the time of focusing at an object at a close distance of the image forming lens system according to the example 3.
Figures 8A, 8B, 8C, 8D:
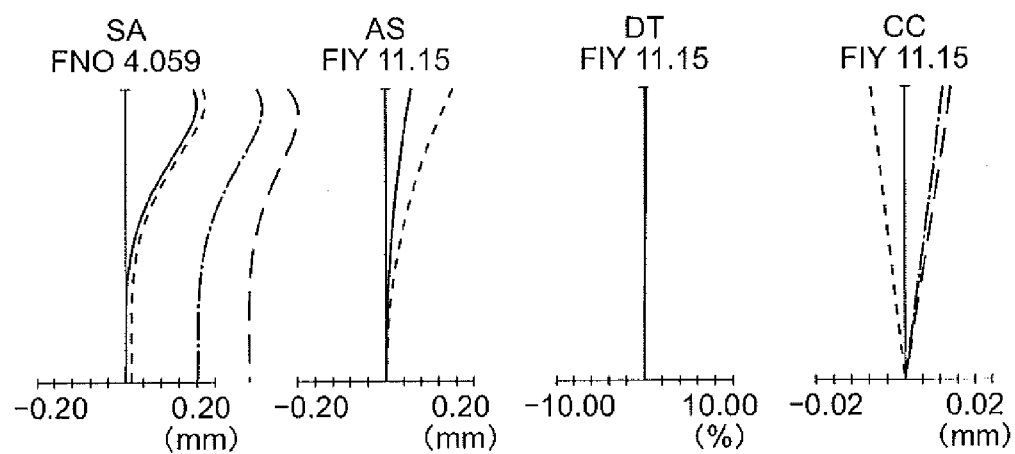
FIG. 8A, FIG. 8B, FIG. 8C, and FIG. 8D are aberration diagrams at the time of focusing at an object at infinity of the image forming lens system according to the example 4.
Figures 8E, 8F, 8G, 8H:
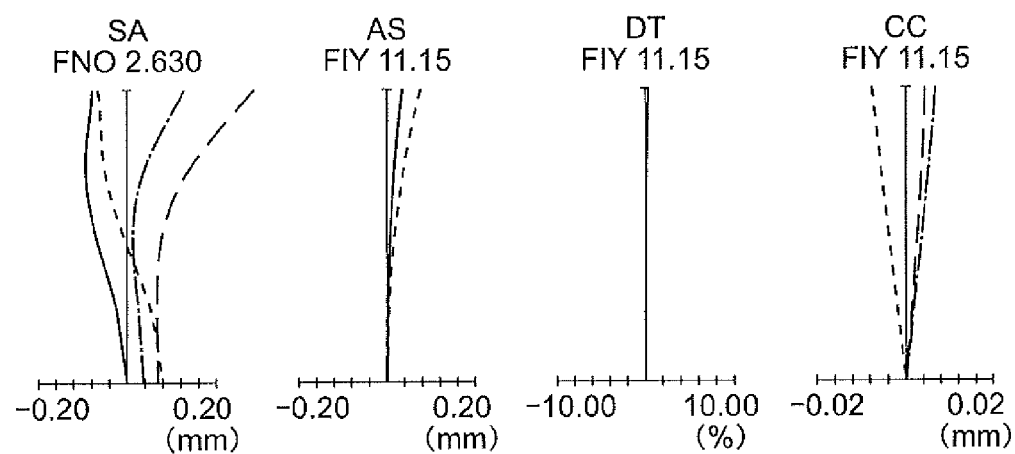
FIG. 8E, FIG. 8F, FIG. 8G, and FIG. 8H are aberration diagrams at the time of focusing at an object at a close distance of the image forming lens system according to the example 4.
Figures 9A, 9B, 9C, 9D:
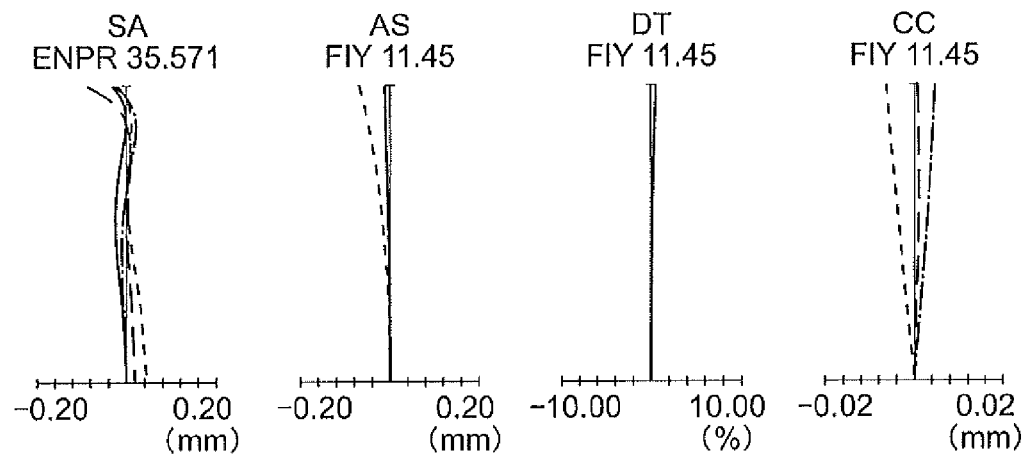
FIG. 9A, FIG. 9B, FIG. 9C, and FIG. 9D are aberration diagrams at the time of focusing at an object at infinity of the image forming lens system according to the example 5.
Figures 9E, 9F, 9G, 9H:
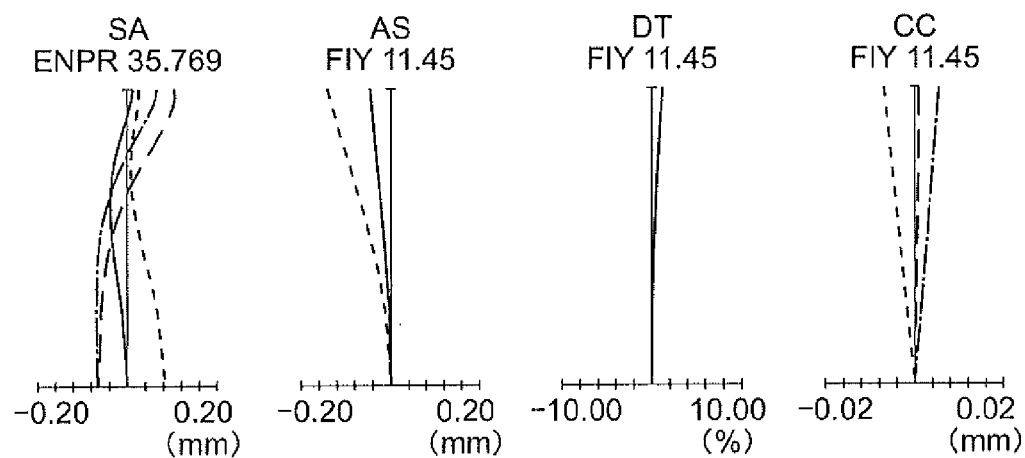
FIG. 9E, FIG. 9F, FIG. 9G, and FIG. 9H are aberration diagrams at the time of focusing at an object at a close distance of the image forming lens system according to the example 5.
Figures 10A, 10B, 10C, 10D:
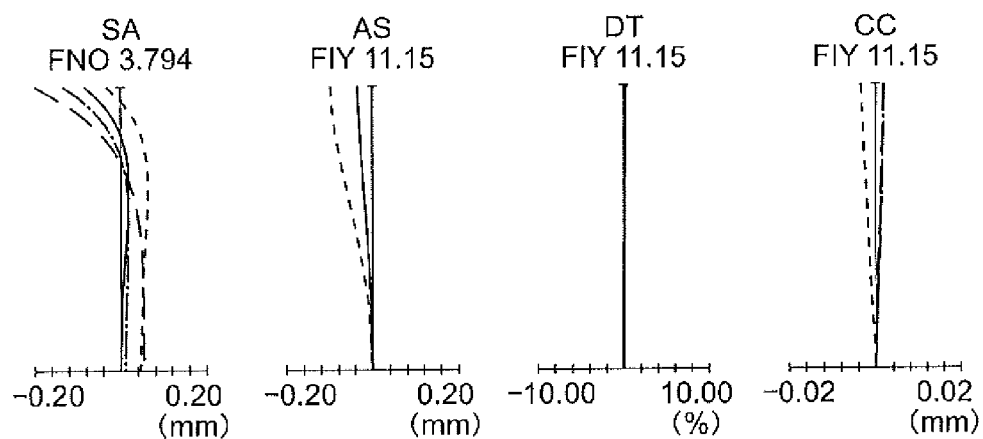
FIG. 10A, FIG. 10B, FIG. 10C, and FIG. 10D are aberration diagrams at the time of focusing at an object at infinity of the image forming lens system according to the example 6.
Figures 10E, 10F, 10G, 10H:
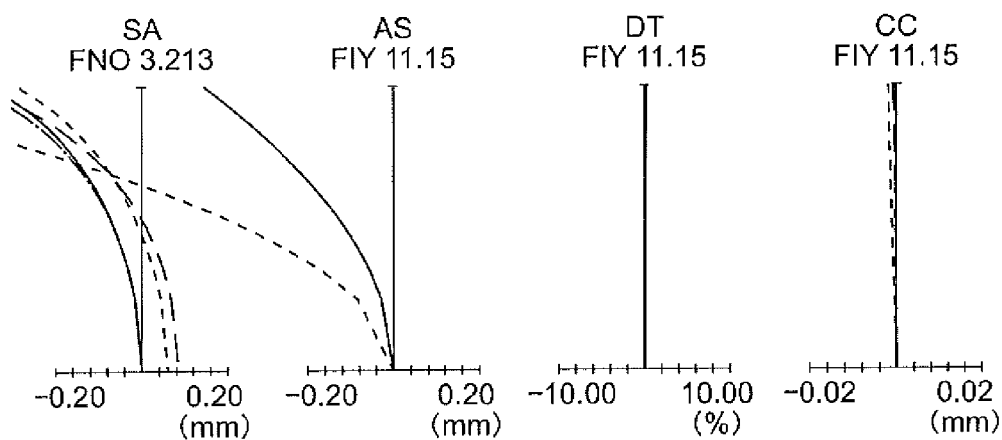
FIG. 10E, FIG. 10F, FIG. 10G, and FIG. 10H are aberration diagrams at the time of focusing at an object at a close distance of the image forming lens system according to the example 6.
Figures 12A, 12B, 12C, 12D:
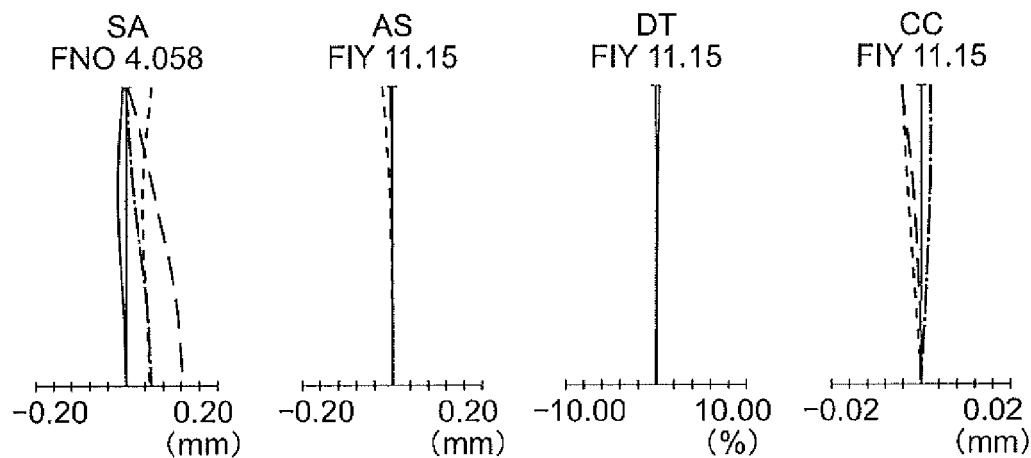
FIG. 12A, FIG. 12B, FIG. 12C, and FIG. 12D are aberration diagrams at the time of focusing at an object at infinity of the image forming lens system according to the example 8.
Figures 12E, 12F, 12G, 12H:
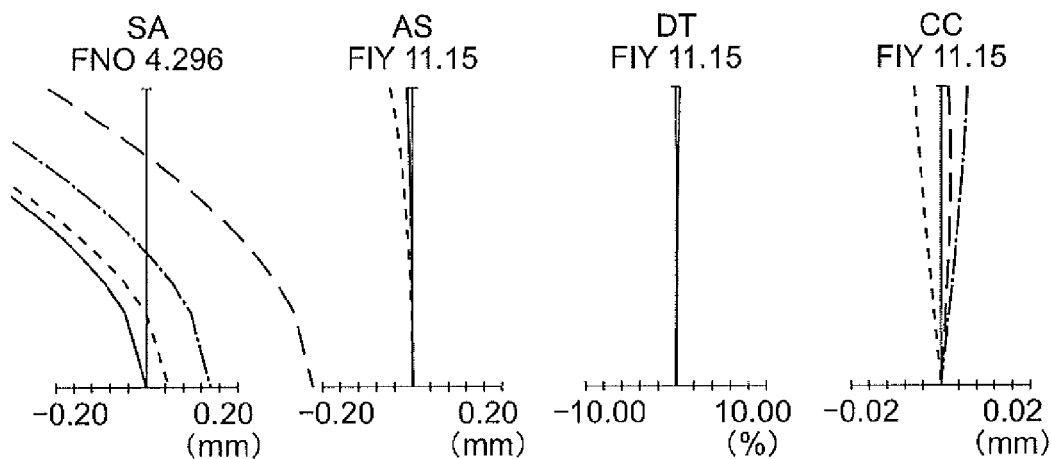
FIG. 12E, FIG. 12F, FIG. 12G, and FIG. 12H are aberration diagrams at the time of focusing at an object at a close distance of the image forming lens system according to the example 8.

Aberration diagrams of examples from the example 1 to the example 8 are shown in FIG. 5A, FIG. 5B, FIG. 5C, FIG.

5D, FIG. 5E, FIG. 5F, FIG. 5G, and FIG. 5H to FIG. 12A, FIG. 12B, FIG. 12C, FIG. 12D, FIG. 12E, FIG. 12F, FIG. 12G, and FIG. 12H.

In these diagrams, FIG. 5A, FIG. 6A, FIG. 7A, FIG. 8A, FIG. 9A, FIG. 10A, FIG. 11A, and FIG. 12A show a spherical aberration (SA) at the time of focusing at an object at infinity, FIG. 5B, FIG. 6B, FIG. 7B, FIG. 8B, FIG. 9B, FIG. 10B, FIG. 11B, and FIG. 12B show an astigmatism (AS) at the time of focusing at an object at infinity, FIG. 5C, FIG. 6C, FIG. 7C, FIG. 8C, FIG. 9C, FIG. 10C, FIG. 11C, and FIG. 12C show a distortion (DT) at the time of focusing at an object at infinity, and FIG. 5D, FIG. 6D, FIG. 7D, FIG. 8D, FIG. 9D, FIG. 10D, FIG. 11D, and FIG. 12D show a chromatic aberration of magnification (CC) at the time of focusing at an object at infinity.

Moreover, FIG. 5E, FIG. 6E, FIG. 7E, FIG. 8E, FIG. 9E, FIG. 10E, FIG. 11E, and FIG. 12E show a spherical aberration (SA) at the time of focusing at an object at a close distance, FIG. 5F, FIG. 6F, FIG. 7F, FIG. 8F, FIG. 9F, FIG. 10F, FIG. 11F, and FIG. 12F show an astigmatism (AS) at the time of focusing at an object at a close distance, FIG. 5G, FIG. 6G, FIG. 7G, FIG. 8G, FIG. 9G, FIG. 10G, FIG. 11G, and FIG. 12G show a distortion (DT) at the time of focusing at an object at a close distance, and FIG. 5H, FIG. 6H, FIG. 7H, FIG. 8H, FIG. 9H, FIG. 10H, FIG. 11H, and FIG. 12H show a chromatic aberration of magnification (CC) at the time of focusing at an object at a close distance. In each diagram, FIY denotes an image height.

Next, values of conditional expressions (1) to (10) in each example are given below.

| Conditional expressions | Example 1 | Example 2 | Example 3 |
|---|---|---|---|
| (1) $|f_{fo}/f|$ | 0.19 | 0.16 | 0.16 |
| (2) $f_{R1}/f_{R3}$ | 2.83 | 0.84 | 2.42 |
| (3) $f_{R2}/f$ | 0.28 | 0.16 | 0.24 |
| (4) $|MG_{ISback} \times (MG_{IS} - 1)|$ | 2 | 1.449 | 2.01 |
| (5) $|(MG_{foback})^2 \times \{(MG_{fo})^2 - 1\}|$ | 4.49 | 3.284 | 4.603 |
| (6) $f_{F4}/f_{fo}$ | −2.35 | −3.46 | −4.02 |
| (7) $|f/r_{G2b}|$ | 0.24 | 2.14 | 1.07 |
| (8) $\Phi_{fo}/\Phi_{La}$ | 0.82 | 0.83 | 0.90 |
| (9) $D_{sfo}/D_{LTL}$ | 0.030 | 0.026 | 0.037 |
| (10) $D_{sfo}/\varphi_s$ | 0.25 | 0.25 | 0.34 |

| Conditional expressions | Example 4 | Example 5 | Example 6 |
|---|---|---|---|
| (1) $|f_{fo}/f|$ | 0.19 | 0.20 | 0.16 |
| (2) $f_{R1}/f_{R3}$ | 2.83 | 1.24 | 0.84 |
| (3) $f_{R2}/f$ | 0.28 | 0.17 | 0.16 |
| (4) $|MG_{ISback} \times (MG_{IS} - 1)|$ | 1.996 | 1.95 | 1.449 |
| (5) $|(MG_{foback})^2 \times \{(MG_{fo})^2 - 1\}|$ | 4.49 | 3 | 3.284 |
| (6) $f_{F4}/f_{fo}$ | −2.35 | −2.71 | −3.46 |
| (7) $|f/r_{G2b}|$ | 0.24 | 3.12 | 7.29 |
| (8) $\Phi_{fo}/\Phi_{La}$ | 1.10 | 0.90 | 1.08 |
| (9) $D_{sfo}/D_{LTL}$ | 0.030 | 0.138 | 0.198 |
| (10) $D_{sfo}/\varphi_s$ | 0.25 | 1.27 | 1.88 |

| Conditional expressions | Example 7 | Example 8 |
|---|---|---|
| (1) $|f_{fo}/f|$ | 0.16 | 0.24 |
| (2) $f_{R1}/f_{R3}$ | 1.52 | 1.52 |
| (3) $f_{R2}/f$ | 0.34 | 0.34 |
| (4) $|MG_{ISback} \times (MG_{IS} - 1)|$ | 1.499 | 1.37 |
| (5) $|(MG_{foback})^2 \times \{(MG_{fo})^2 - 1\}|$ | 3.363 | 5.14 |
| (6) $f_{F4}/f_{fo}$ | −3.26 | −2.14 |
| (7) $|f/r_{G2b}|$ | 0.66 | 2.58 |
| (8) $\Phi_{fo}/\Phi_{La}$ | 0.85 | 1.04 |
| (9) $D_{sfo}/D_{LTL}$ | 0.238 | 0.099 |
| (10) $D_{sfo}/\varphi_s$ | 1.21 | 0.51 |

Figure 13:
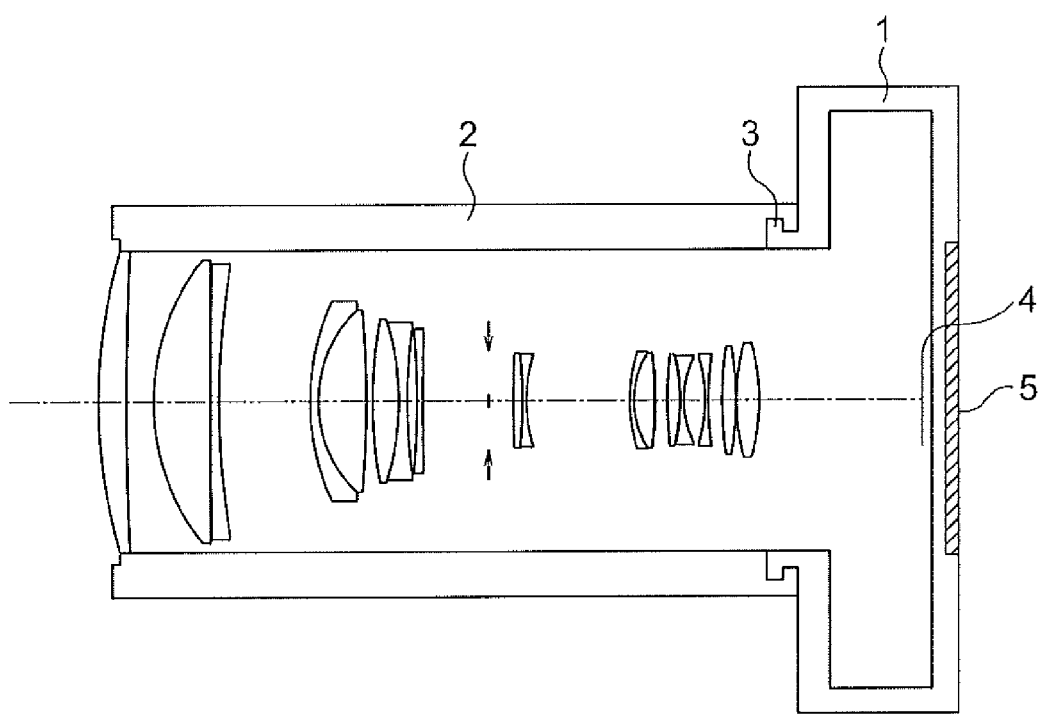
FIG. 13 is a cross-sectional view of a digital camera in which the image forming lens system according to the example 1 is incorporated.

FIG. 13 is a cross-sectional view of a single-lens mirrorless camera as an electronic image pickup apparatus. In FIG. 13, a taking lens system 2 is disposed inside a lens barrel of a single-lens mirrorless camera 1. Amount portion 3 enables the taking lens system 2 to be detachable from a body of the single-lens mirrorless camera 1. As the mount portion 3, a mount such as a screw-type mount and a bayonet-type mount is to be used. In this example, a bayonet-type mount is used. Moreover, an image pickup element surface 4 and a back monitor 5 are disposed in the body of the single-lens mirrorless camera 1. As an image pickup element, an element such as a small-size CCD (charge coupled device) or a CMOS (complementary metal-oxide semiconductor) is to be used.

Moreover, as the taking lens system 2 of the single-lens mirrorless camera 1, the image forming lens system described in any one of the examples from the first example to the eighth example is to be used.

Figure 14:
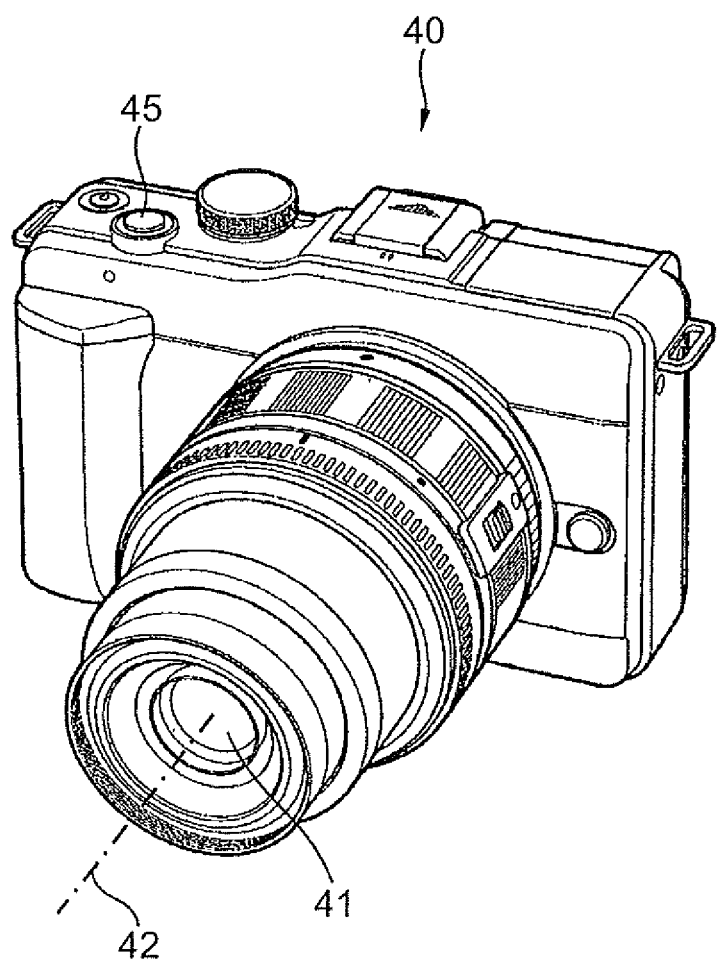
FIG. 14 is a front perspective view of the digital camera.
Figure 15:
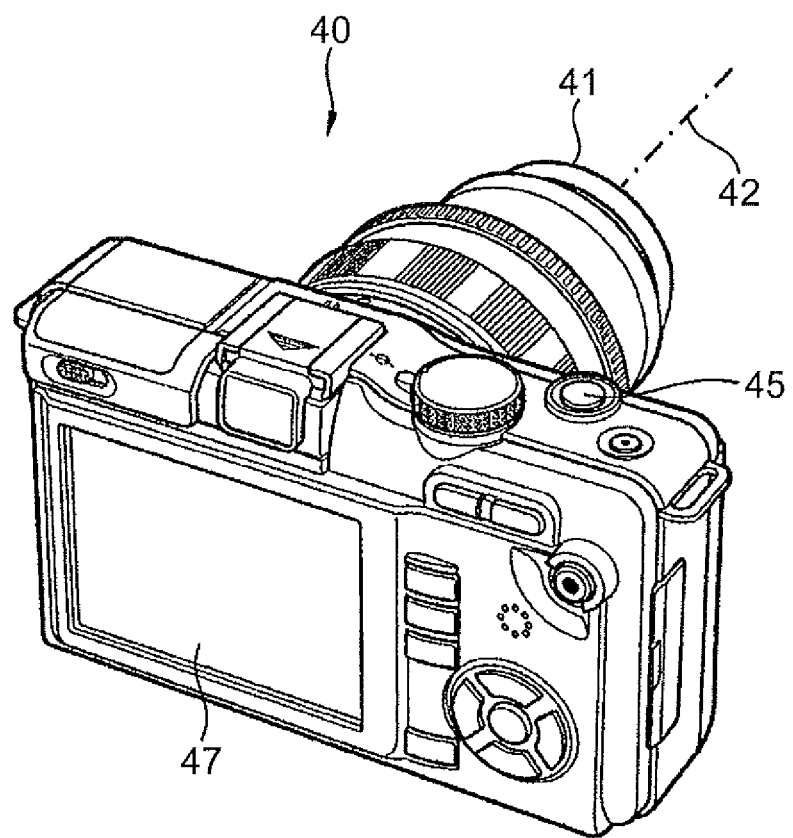
FIG. 15 is a rear perspective view of the digital camera.

FIG. 14 and FIG. 15 are conceptual diagrams of an arrangement of the image pickup apparatus according to the present invention. FIG. 14 is a front perspective view showing an appearance of a digital camera 40 as the image pickup apparatus, and FIG. 15 is a rear perspective view of the digital camera 40. The image forming lens system according to the present invention is used in a photographic optical system 41 of the digital camera 40.

The digital camera 40 according to the present embodiment includes the photographic optical system 41 which is positioned in a photographic optical path 42, a shutter button 45, and a liquid-crystal display monitor 47. As the shutter button 45 disposed on an upper portion of the digital camera 40 is pressed, in conjunction with the pressing of the shutter button 45, photography is carried out by the photographic optical system 41 such as the image forming lens system according to the first example. An object image which is formed by the photographic optical system 41 is formed on an image pickup element (photoelectric conversion surface) which is provided near an image forming surface. The object image which has been received optically by the image pickup element is displayed on the liquid-crystal display monitor 47 which is provided to a rear surface of the camera, as an electronic image by a processing means. Moreover, it is possible to record the electronic image which has been photographed, in a recording means.

Figure 16:
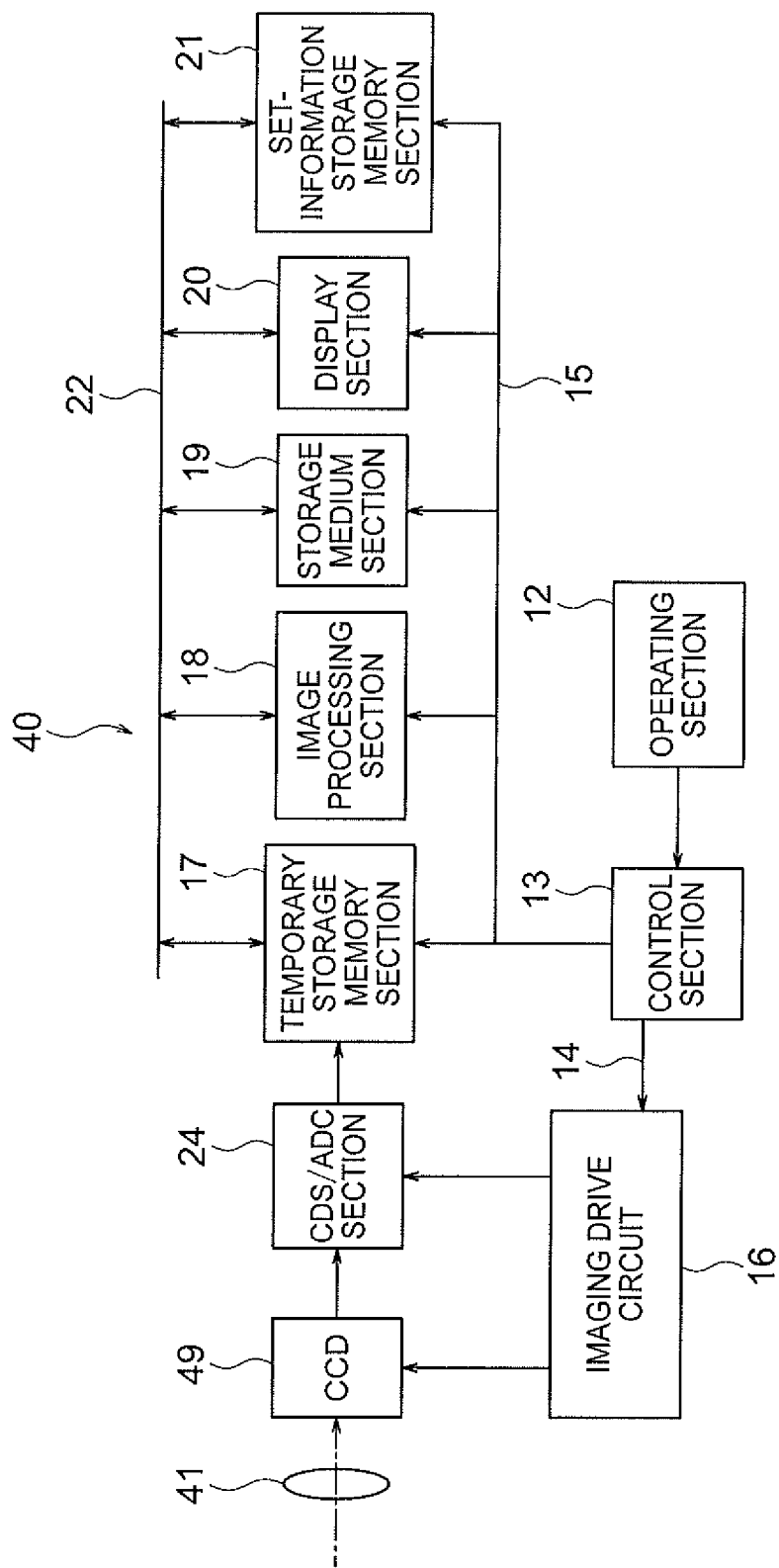
FIG. 16 is a schematic block diagram of an internal circuit of main components of the digital camera.

FIG. 16 is a structural block diagram of an internal circuit of main components of the digital camera 40. In the following description, the processing means described above includes for instance, a CDS/ADC section 24, a temporary storage memory 117, and an image processing section 18, and a storage means consists of a storage medium section 19 for example.

As shown in FIG. 16, the digital camera 40 includes an operating section 12, a control section 13 which is connected to the operating section 12, the temporary storage memory 17 and an imaging drive circuit 16 which are connected to a control-signal output port of the control section 13, via a bus 14 and a bus 15, the image processing section 18, the storage medium section 19, a display section 20, and a set-information storage memory section 21.

The temporary storage memory 17, the image processing section 18, the storage medium section 19, the display section 20, and the set-information storage memory section 21 are structured to be capable of mutually inputting and outputting data via a bus 22. Moreover, the CCD 49 and the CDS/ADC section 24 are connected to the imaging drive circuit 16.

The operating section 12 includes various input buttons and switches, and informs the control section 13 of event information which is input from outside (by a user of the digital camera) via these input buttons and switches. The control section 13 is a central processing unit (CPU), and has a built-in computer program memory which is not shown in the diagram. The control section 13 controls the entire digital camera 40 according to a computer program stored in this computer program memory.

The CCD 49 is driven and controlled by the imaging drive circuit 16, and which converts an amount of light for each pixel of the object image to an electric signal, and outputs to the CDS/ADC section 24.

The CDS/ADC section 24 is a circuit which amplifies the electric signal which is input from the CCD 49, and carries out analog/digital conversion, and outputs to the temporary storage memory 17 image raw data (Bayer data, hereinafter called as 'RAW data') which is only amplified and converted to digital data.

The temporary storage memory 17 is a buffer which includes an SDRAM (Synchronous Dynamic Random Access Memory) for example, and is a memory device which stores temporarily the RAW data which is output from the CDS/ADC section 24. The image processing section 18 is a circuit which reads the RAW data stored in the temporary storage memory 17, or the RAW data stored in the storage medium section 19, and carries out electrically various image-processing including the distortion correction, based on image-quality parameters specified by the control section 13.

The storage medium section 19 is a recording medium in the form of a card or a stick including a flash memory for instance, detachably mounted. The storage medium section 19 records and maintains the RAW data transferred from the temporary storage memory 17 and image data subjected to image processing in the image processing section 18 in the card flash memory and the stick flash memory.

The display section 20 includes the liquid-crystal display monitor, and displays images and operation menu on the liquid-crystal display monitor. The set-information storage memory section 21 includes a ROM section in which various image quality parameters are stored in advance, and a RAM section which stores image quality parameters which are selected by an input operation on the operating section 12, from among the image quality parameters which are read from the ROM section.

In the digital camera 40 in which such an arrangement is made, by adopting the image forming lens system according to the present invention as the photographing optical system 41, since it is easy to shorten the overall length of the optical system and to make the diameter of the optical system small, and it is possible to make the overall optical system light-weight and to make a focusing speed high, while maintaining a superior focusing performance, the digital camera 40 has a superior mobility, and enables to carry out photography with high resolution. Moreover, it is possible to use the image forming lens system according to the present invention in an image pickup apparatus of a type having a quick-return mirror.

According to the present invention, it is possible to provide an image forming lens system having a superior mobility in which, it is easy to shorten the overall length of the optical system and to make the diameter of the optical system small, and in which, aberrations are corrected favorably, and an image pickup apparatus which includes the image forming lens system.

As described heretofore, an object of the present invention is to provide an image forming lens system having a superior mobility, in which, it is easy to shorten the overall length of the optical system and to make the diameter of the optical system small, and in which, aberrations are corrected favorably, and an image pickup apparatus which includes the image forming lens system. Moreover, the image forming lens system and the image pickup apparatus according to the present invention are suitable for an image forming lens system which has an angle of view of a telephoto area and of an ultra-telephoto area, and an image pickup apparatus which includes the image forming lens system. Particularly, the present invention is useful for a telephoto lens and an ultra-telephoto lens. Moreover, as it enables to make the focusing lens unit light-weight, and to make the focusing unit small-sized, and light-weight, and makes it easy to make the overall image forming lens system light-weight and to increase the focusing speed, it is suitable for an image forming lens system which has a superior mobility.

What is claimed is:

1. An image forming lens system comprising:
   an aperture stop; and
   an image-side lens unit group which is disposed on an image side of the aperture stop, wherein
   the image-side lens unit group includes in order from the aperture stop to the image side along an optical axis, a first image-side lens unit having a negative refractive power, a second image-side lens unit having a positive refractive power, and a third image-side lens unit having a negative refractive power, and
   any one of the first image-side lens unit, the second image-side lens unit, and the third image-side lens unit is a focusing lens unit which moves along the optical axis at the time of focusing from an object at infinity to an object at a close distance, and
   an object-side lens unit group which is disposed on an object side of the aperture stop, wherein
   the object-side lens unit group includes a plurality of lenses, and
   all the lenses disposed on the object side of the aperture stop are included in the object-side lens unit group, and
   an object-side partial lens system which includes all the lenses on the object side of the first image-side lens unit, has a positive refractive power, and
   the focusing lens unit satisfies the following conditional expression (5):

$$1.5 < |(MG_{foback})^2 \times \{(MG_{fo})^2 - 1\}| < 8.0 \tag{5}$$

where,
   $MG_{fo}$ denotes a lateral magnification of the focusing lens unit in an arbitrary focused state, and
   $MG_{foback}$ denotes a lateral magnification of the overall optical system between the focusing lens unit and the image plane, in an arbitrary focused state.

2. The image forming lens system according to claim 1, wherein the first image-side lens unit and the second image-side lens unit are lens units in which only an entrance surface and an exit surface are in contact with air in an optical path.

3. The image forming lens system according to claim 1, wherein
   a lens unit having a positive refractive power is disposed on the object side of the first image-side lens unit, at a position adjacent to an image side of the aperture stop, and
   there is no other lens between the first image-side lens unit and the lens unit having a positive refractive power.

4. The image forming lens system according to claim 1, wherein
   the following conditional expression (2) is satisfied:

$$0.2 < f_{R1}/f_{R3} < 3.6 \tag{2}$$

where,
   $f_{R1}$ denotes a focal length of the first image-side lens unit, and
   $f_{R3}$ denotes a focal length of the third image-side lens unit.

5. The image forming lens system according to claim 1, wherein the following conditional expression (3) is satisfied:

$$0.08 < f_{R2}/f < 0.33 \quad (3)$$

where, $f_{R2}$ denotes a focal length of the second image-side lens unit, and f denotes a focal length of the image forming lens system at the time of focusing at an object at infinity.

6. The image forming lens system according to claim 1, wherein
any one of the first image-side lens unit, the second image-side lens unit, and the third image-side lens unit is an image-motion correcting lens unit, and
the image-motion correcting lens unit moves in a direction different from a direction of the optical axis, to reduce an image motion due to shaking of the image forming lens system.

7. The image forming lens system according to claim 6, wherein any one of the first image-side lens unit, the second image-side lens unit, and the third image-side lens unit is the focusing lens unit, and another one of the first image-side lens unit, the second image-side lens unit, and the third image-side lens unit is the image-motion correcting lens unit.

8. The image forming lens system according to claim 1, wherein the image-side lens unit group includes a fourth image-side lens unit having a positive refractive power, which is disposed on the image side of the third image-side lens unit, immediately after the third image-side lens unit.

9. The image forming lens system according to claim 1, wherein the first image-side lens unit is the focusing lens unit.

10. The image forming lens system according to claim 1, wherein the focusing lens unit includes not more than two lenses.

11. The image forming lens system according to claim 1, wherein the focusing lens unit consists of one positive lens and one negative lens.

12. The image forming lens system according to claim 1, wherein
the image-side lens unit group includes in order from the aperture stop to the image side, the first image-side lens unit, the second-image side lens unit, the third image-side lens unit, and a fourth image-side lens unit having a positive refractive power, and
the first image-side lens unit is the focusing lens unit, and
the third image-side lens unit is an image-motion correcting lens unit which moves in a direction different from a direction of the optical axis to reduce an image motion due to shaking of the image forming lens system.

13. The image forming lens system according to claim 1, wherein an optical system which includes all lenses on the object side of the focusing lens unit has a positive refractive power that satisfies the following conditional expression (6):

$$-4.5 < f_{FA}/f_{fo} < -1.5 \quad (6)$$

where, $f_{FA}$ denotes a focal length of the optical system which includes all the lenses on the object side of the focusing lens unit, and $f_{fo}$ denotes a focal length of the focusing lens unit.

14. The image forming lens system according to claim 1, wherein the lens units other than the focusing lens unit in the image-side lens unit group do not move in the optical axial direction.

15. The image forming lens system according to claim 14, wherein the image forming lens system is a single focal length lens system with a fixed focal length in a state of focus at an object at infinity.

16. The image forming lens system according to claim 1, wherein a plurality of lenses is disposed on the object side of the image-side lens unit group, and positions of all of the plurality of lenses disposed on the object side of the image-side lens unit group are fixed.

17. The image forming lens system according to claim 1, wherein the following conditional expression (7) is satisfied:

$$0 \le |f/r_{G2b}| < 7.0 \quad (7)$$

where, f denotes the focal length of the image forming lens system at the time of focusing at an object at infinity, and $r_{G2b}$ denotes a paraxial radius of curvature of a lens surface on the object side of the focusing lens unit, immediately before the focusing lens unit.

18. The image forming lens system according to claim 1, wherein
the following conditional expression (8) is satisfied:

$$0.5 \le \phi_{fo}/\phi_{La} \le 0.92 \quad (8)$$

where, $\phi_{fo}$ denotes a maximum effective aperture from among effective apertures of lenses in the focusing lens unit, and $\phi_{La}$ denotes a maximum effective aperture of a lens positioned nearest to the image in the image forming lens system.

19. The image forming lens system according to claim 1, wherein the following conditional expression (9) is satisfied:

$$0.023 \le D_{sfo}/D_{LTL} \le 0.110 \quad (9)$$

where, $D_{sfo}$ denotes a distance on the optical axis from the aperture stop up to a lens surface nearest to an object of the focusing lens unit, $D_{LTL}$ denotes a distance on the optical axis from a lens surface nearest to the object of the image forming lens system up to an image plane, and both $D_{sfo}$ and $D_{LTL}$ are distances at the time of focusing at an object at infinity.

20. The image forming lens system according to claim 1, wherein the following conditional expression (10) is satisfied:

$$0.2 \le D_{sfo}/\Phi_s \le 0.8 \quad (10)$$

where, $D_{sfo}$ denotes the distance on the optical axis from the aperture stop up to a lens surface nearest to an object of the focusing lens unit, and is a distance at the time of focusing at an object at infinity, and $\Phi_s$ denotes a maximum diameter of the aperture stop.

21. The image forming lens system according to claim 1, wherein an optical system positioned on the image side of the focusing lens unit includes at least two positive lenses and one negative lens.

22. An image pickup apparatus comprising:
an optical system; and
an image pickup element which has an image pickup surface, and which converts an image formed on the image pickup surface by the optical system to an electric signal, wherein
the optical system is the image forming lens system according to claim 1.

23. An image forming lens system comprising:
an aperture stop; and
an image-side lens unit group which is disposed on an image side of the aperture stop, wherein
the image-side lens unit group includes in order from the aperture stop to the image side along an optical axis, a first image-side lens unit having a negative refractive power, a second image-side lens unit having a positive refractive power, and a third image-side lens unit having a negative refractive power, and
the first image-side lens unit is a focusing lens unit which moves along the optical axis at the time of focusing from an object at infinity to an object at a close distance, and
the image-side lens unit group includes a fourth image-side lens unit having a positive refractive power, which is disposed on the image side of the third image-side lens unit, immediately after the third image-side lens unit, and
a lens unit having a positive refractive power is disposed on the object side of the first image-side lens unit, at a position adjacent to an image side of the aperture stop, and
the lens unit having a positive refractive power includes a plurality of lenses, and
there is no other lens between the first image-side lens unit and the lens unit having a positive refractive power.

24. An image forming lens system comprising:
an aperture stop; and
an image-side lens unit group which is disposed on an image side of the aperture stop, wherein
the image-side lens unit group includes in order from the aperture stop to the image side along an optical axis, a first image-side lens unit having a negative refractive power, a second image-side lens unit having a positive refractive power, and a third image-side lens unit having a negative refractive power, and
the third image-side lens unit is a focusing lens unit which moves along the optical axis at the time of focusing from an object at infinity to an object at a close distance, and
the image-side lens unit group includes a fourth image-side lens unit having a positive refractive power, which is disposed on the image side of the third image-side lens unit, immediately after the third image-side lens unit, and
a lens unit having a positive refractive power is disposed on the object side of the first image-side lens unit, at a position adjacent to an image side of the aperture stop, and
there is no other lens between the first image-side lens unit and the lens unit having a positive refractive power.

25. The image forming lens system according to claim 24, wherein the first image-side lens unit and the second image-side lens unit are lens units in which only an entrance surface and an exit surface are in contact with air in an optical path.

26. An image forming lens system comprising:
an aperture stop; and
an image-side lens unit group which is disposed on an image side of the aperture stop, wherein
the image-side lens unit group includes in order from the aperture stop to the image side along an optical axis, a first image-side lens unit having a negative refractive power, a second image-side lens unit having a positive refractive power, and a third image-side lens unit having a negative refractive power, and
the first image-side lens unit or the third image-side lens unit is a focusing lens unit which moves along the optical axis at the time of focusing from an object at infinity to an object at a close distance, and
the focusing lens unit includes at least one positive lens and at least one negative lens, and
a lens unit having a positive refractive power is disposed on the object side of the first image-side lens unit, at a position adjacent to an image side of the aperture stop, and
there is no other lens between the first image-side lens unit and the lens unit having a positive refractive power, and
number of the focusing lens unit included in the image forming lens system is only one.

27. An image forming lens system comprising:
an aperture stop; and
an image-side lens unit group which is disposed on an image side of the aperture stop, wherein
the image-side lens unit group includes in order from the aperture stop to the image side along an optical axis, a first image-side lens unit having a negative refractive power, a second image-side lens unit having a positive refractive power, and a third image-side lens unit having a negative refractive power, and
any one of the first image-side lens unit, the second image-side lens unit, and the third image-side lens unit is a focusing lens unit which moves along the optical axis at the time of focusing from an object at infinity to an object at a close distance, and
a lens unit having a positive refractive power is disposed on the object side of the first image-side lens unit, at a position adjacent to an image side of the aperture stop, and
there is no other lens between the first image-side lens unit and the lens unit having a positive refractive power, and
the first image-side lens unit or the third image-side lens unit includes at least one positive lens and at least one negative lens.

28. An image forming lens system comprising:
an aperture stop; and
an image-side lens unit group which is disposed on an image side of the aperture stop, wherein
the image-side lens unit group includes in order from the aperture stop to the image side along an optical axis, a first image-side lens unit having a negative refractive power, a second image-side lens unit having a positive refractive power, and a third image-side lens unit having a negative refractive power, and
any one of the first image-side lens unit, the second image-side lens unit, and the third image-side lens unit is a focusing lens unit which moves along the optical axis at the time of focusing from an object at infinity to an object at a close distance, and
the second image-side lens unit includes a plurality of positive lenses, and
the third image-side lens unit consists of one negative lens and one positive lens.

29. An image forming lens system comprising:
an aperture stop; and
an image-side lens unit group which is disposed on an image side of the aperture stop, wherein
the image-side lens unit group includes in order from the aperture stop to the image side along an optical axis, a first image-side lens unit having a negative refractive power, a second image-side lens unit having a positive refractive power, and a third image-side lens unit having a negative refractive power, and the first image-side lens unit or the third image-side lens unit is a focusing lens unit which moves along the optical axis at the time of focusing from an object at infinity to an object at a close distance, and the focusing lens unit includes at least one positive lens and at least one negative lens, and number of the focusing lens unit included in the image forming lens system is only one.

30. The image forming lens system according to claim 29, wherein a lens unit having a positive refractive power is disposed on the object side of the first image-side lens unit, at a position adjacent to an image side of the aperture stop, and there is no other lens between the first image-side lens unit and the lens unit having a positive refractive power.

* * * * *